(12) United States Patent
Kuwahara et al.

(10) Patent No.: US 10,103,657 B2
(45) Date of Patent: Oct. 16, 2018

(54) MOTOR DRIVE CONTROL APPARATUS, ELECTRIC POWER STEERING APPARATUS, AND VEHICLE

(71) Applicant: NSK Ltd., Shinagawa-ku, Tokyo (JP)

(72) Inventors: Masaki Kuwahara, Fujisawa (JP); Shigeyuki Uematsu, Fujisawa (JP)

(73) Assignee: NSK, Ltd., Tokyo (JP)

(*) Notice: Subject to any disclaimer, the term of this patent is extended or adjusted under 35 U.S.C. 154(b) by 0 days.

(21) Appl. No.: 15/570,453

(22) PCT Filed: Apr. 26, 2017

(86) PCT No.: PCT/JP2017/016523
§ 371 (c)(1),
(2) Date: Oct. 30, 2017

(87) PCT Pub. No.: WO2017/195601
PCT Pub. Date: Nov. 16, 2017

(65) Prior Publication Data
US 2018/0234039 A1    Aug. 16, 2018

(30) Foreign Application Priority Data
May 13, 2016   (JP) ................... 2016-097216

(51) Int. Cl.
*H02P 1/00* (2006.01)
*H02P 6/16* (2016.01)
(Continued)

(52) U.S. Cl.
CPC .............. *H02P 6/16* (2013.01); *B62D 5/0463* (2013.01); *B62D 5/0475* (2013.01); *B62D 5/0484* (2013.01); *H02P 6/12* (2013.01)

(58) Field of Classification Search
CPC ...... B62D 5/046; B62D 5/0463; B62D 5/049; B62D 5/0487; B62D 5/064
See application file for complete search history.

(56) References Cited

U.S. PATENT DOCUMENTS

2011/0290580 A1* 12/2011 Mukai .................... B62D 5/04
                                                        180/443
2012/0239254 A1    9/2012 Heilig et al.
(Continued)

FOREIGN PATENT DOCUMENTS

JP     2012-5231 A    1/2012
JP     2014-7784 A    1/2014
(Continued)

OTHER PUBLICATIONS

International Search Report (PCT/ISA/210) issued in PCT Application No. PCT/JP2017/016523 dated Jul. 25, 2017 (three pages).
(Continued)

*Primary Examiner* — Shawki S Ismail
*Assistant Examiner* — Zoheb Imtiaz
(74) *Attorney, Agent, or Firm* — Crowell & Moring LLP

(57) ABSTRACT

The motor drive control apparatus includes first and second rotation information detection function units and a power control unit. When it is determined the ignition switch is changed from the ON state to the OFF state, the power control unit intermittently supplies power from a battery to the first and second rotation information detection function units at a first interval while a motor rotation number is lower than a preset rotation number set in advance. When it is determined the motor rotation number becomes equal to or higher than the preset rotation number during this intermittent supply state, the power control unit intermittently supplies the power from the battery to the first and second rotation information detection function units at a second interval shorter than the first interval while the motor rotation number is equal to or higher than the preset rotation number.

20 Claims, 10 Drawing Sheets

(51) Int. Cl.
*B62D 5/04* (2006.01)
*H02P 6/12* (2006.01)

(56) References Cited

U.S. PATENT DOCUMENTS

| | | | |
|---|---|---|---|
| 2012/0273290 A1* | 11/2012 | Kawano | B62D 5/046 |
| | | | 180/443 |
| 2013/0233638 A1 | 9/2013 | Lee | |
| 2013/0314015 A1* | 11/2013 | Hoshi | B62D 5/046 |
| | | | 318/400.23 |
| 2014/0019009 A1* | 1/2014 | Kogiso | B62D 15/0235 |
| | | | 701/42 |
| 2015/0175191 A1 | 6/2015 | Harada et al. | |
| 2016/0231142 A1 | 8/2016 | Kawano et al. | |

FOREIGN PATENT DOCUMENTS

| | | |
|---|---|---|
| JP | 2015-116964 A | 6/2015 |
| JP | 2016-55678 A | 4/2016 |
| WO | WO 2015/125235 A1 | 8/2015 |

OTHER PUBLICATIONS

Japanese-language Written Opinion (PCT/ISA/237) issued in PCT Application No. PCT/JP2017/016523 dated Jul. 25, 2017 with English translation (10 pages).

\* cited by examiner

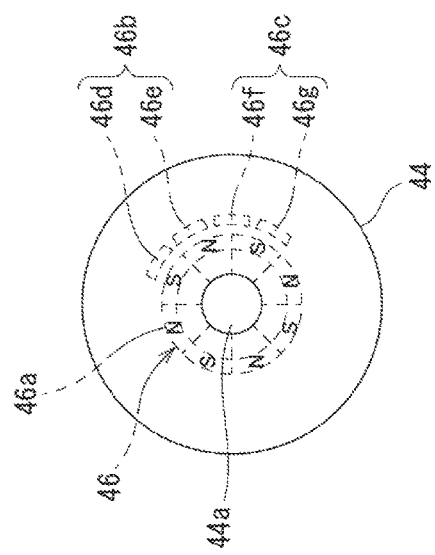
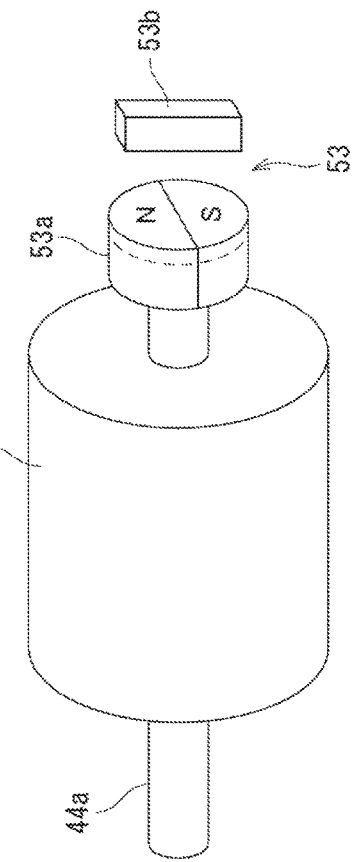
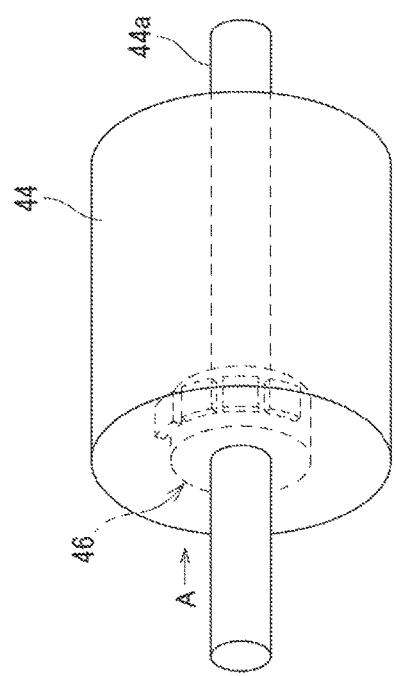
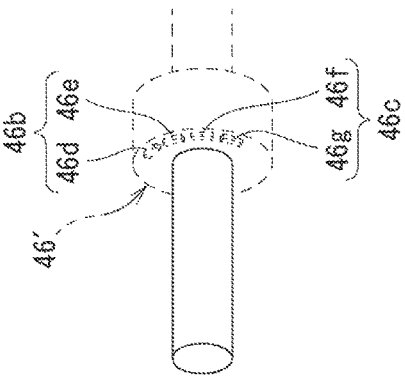

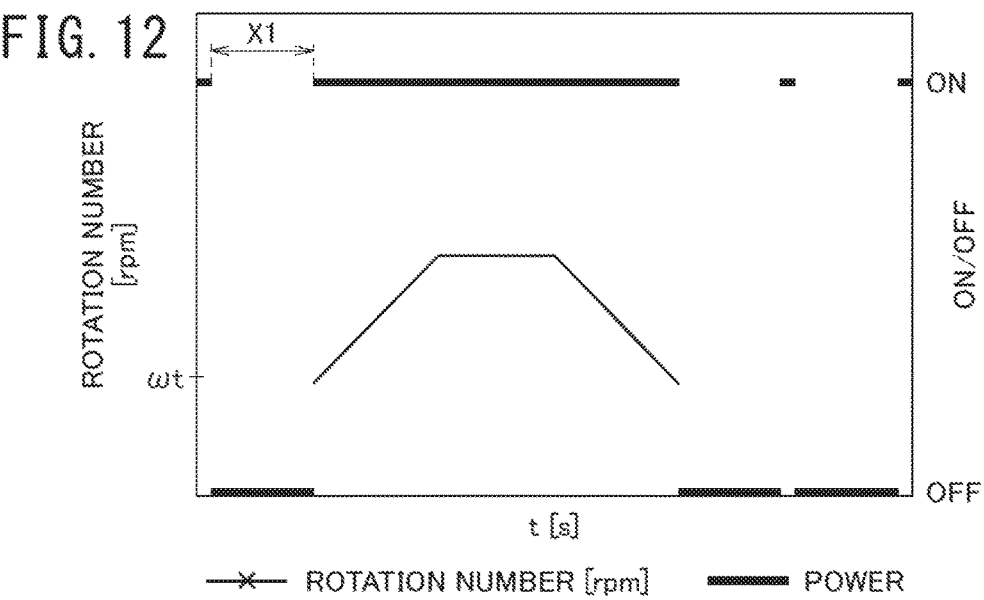
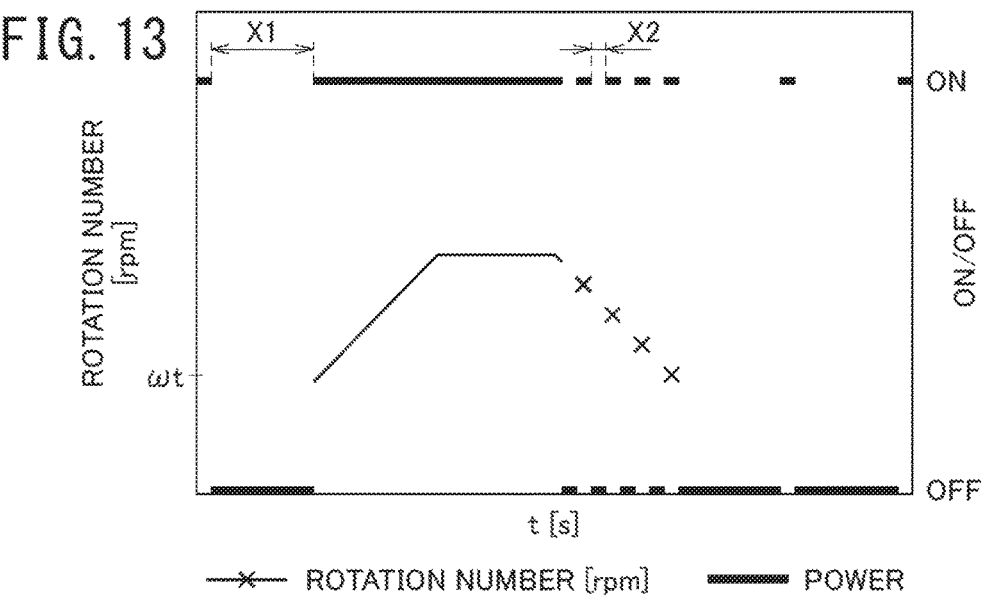

MOTOR DRIVE CONTROL APPARATUS, ELECTRIC POWER STEERING APPARATUS, AND VEHICLE

TECHNICAL FIELD

The present invention relates to a motor drive control apparatus that controls a driving operation of an electric motor used to apply a steering assistance force to a steering shaft, an electric power steering apparatus having the same, and a vehicle.

BACKGROUND ART

In the prior art, there is disclosed a technology described in Patent Literature 1, for example as a technology of detecting steering position information from a motor rotation angle. In this technology, the steering position information is calculated on the basis of an angular signal detected during an off-state by supplying power to a dedicated magnetic detection element even when an ignition switch is in the OFF state. In such a technology, a low power consumption mode is provided, in which supply of power to the dedicated magnetic detection element stops for a certain period of time when power is supplied in the OFF state.

PRIOR ART DOCUMENTS

Patent Documents

PTL 1: JP 2015-116964 A

SUMMARY OF THE INVENTION

Problems to be Solved

However, in the prior art discussed in Patent Literature 1 described above, if a change of the angle of the electric motor is detected while power is intermittently supplied in a low power consumption mode, monitoring is continuously performed until the angle change stops (power is continuously supplied). For this reason, power is continuously supplied even when the angle changes at a rotation number sufficient by intermittently supplying power. Therefore, there is a demand for improvement in terms of reducing the power consumption.

In this regard, in view of the unsolved problems of the prior art, it is therefore an object of the present invention to provide a motor drive control apparatus, an electric power steering apparatus, and a vehicle suitable for reducing the battery power consumption used to detect the motor rotation information during the OFF state of the ignition switch.

Solution to the Problem

In order to address aforementioned problems, according to a first aspect of the present invention, there is provided a motor drive control apparatus including: a ring-shaped or disk-shaped magnet provided rotatably in synchronization with a motor rotation shaft of an electric motor that applies a steering assistance force to a steering shaft and provided with two or more different magnetic poles arranged alternatingly along a circumferential direction; a rotation information detection function unit provided with a rotational position information detector that detects a magnetic flux of the magnet as rotational position information and a rotation information detector that detects rotation information relating to a rotational displacement of the electric motor on the basis of the rotational position information detected by the rotational position information detector; a motor drive control unit that drives and controls the electric motor on the basis of the rotation information output from the rotation information detection function unit; and a power control unit that, when it is determined that an ignition switch is in an OFF state, intermittently supplies power from a battery to the rotation information detection function unit at a first interval set in advance during the OFF state of the ignition switch while, when it is determined that a motor rotation number of the electric motor becomes equal to or higher than a preset rotation number set in advance, intermittently supplies power from the battery at a second interval shorter than the first interval set in advance while the motor rotation number is equal to or higher than the preset rotation number.

In addition, in order to address the aforementioned problems, according to a second aspect of the present invention, there is provided a motor drive control apparatus including: a ring-shaped or disk-shaped magnet provided rotatably in synchronization with a motor rotation shaft of an electric motor that applies a steering assistance force to a steering shaft and provided with two or more different magnetic poles arranged alternatingly along a circumferential direction; a rotation information detection function unit provided with a rotational position information detector that detects a magnetic flux of the magnet as rotational position information and a rotation information detector that detects rotation information relating to a rotational displacement of the electric motor on the basis of the rotational position information detected by the rotational position information detector; a motor drive control unit that drives and controls the electric motor on the basis of the motor rotation angle output from the rotation information detection function unit, a change amount of the rotational position and the rotation count; and a power control unit that, when it is determined that an ignition switch is in an OFF state, intermittently supplies power from a battery to the rotation information detection function unit at a first interval set in advance during the OFF state of the ignition switch, and, if it is determined that a motor rotation number of the electric motor becomes equal to or higher than a preset rotation number set in advance, continuously supplies the power from the battery while the motor rotation number is equal to or higher than the preset rotation number.

Furthermore, in order to address the aforementioned problems, according to a third aspect of the present invention, there is provided an electric power steering apparatus provided with the motor drive control apparatus according to the first and second aspects.

Moreover, in order to address the aforementioned problems, according to a fourth aspect of the present invention, there is provided a vehicle provided with the electric power steering apparatus according to the third aspect.

Advantageous Effects of the Invention

Using the motor drive control apparatus according to the present invention, it is possible to intermittently supply the battery power to the rotation information detection function unit at the first interval during the OFF state of the ignition switch, and intermittently supply the battery power at the second interval shorter than the first interval while the motor rotation number is equal to or higher than the preset rotation number set in advance when the motor rotation number becomes equal to or higher than the preset rotation number set in advance. As a result, when the rotation number of the electric motor is relatively slow (the change of the rotational position is relatively small), it is possible to supply power at a relatively long supply interval by focusing on the low power consumption. In addition, when the rotation number of the electric motor is relatively fast (the change of the rotational position is relatively large), it is possible to continuously supply power at a relatively short supply interval or without an interval by focusing on followability to that change. As a result, it is possible to reduce the power consumption of the battery while maintaining detection accuracy of the motor rotation information compared to the prior art.

In addition, using the electric power steering apparatus provided with the motor drive control apparatus described above, it is possible to perform a steering assistance control with high reliability. Furthermore, using the vehicle provided with the electric power steering apparatus, it is possible to perform a steering assistance control with high reliability.

BRIEF DESCRIPTION OF THE DRAWINGS

FIGS. 3A and 3B are diagrams illustrating an exemplary configuration of a motor rotation sensor according to the first embodiment;

FIGS. 3C and 3D are diagrams illustrating another exemplary configuration;

FIG. 12 is a waveform diagram illustrating an exemplary power supply control when the IG switch according to a fifth embodiment is in an OFF state;

FIG. 13 is a waveform diagram illustrating an exemplary power supply control when the IG switch according to a sixth embodiment is in an OFF state.

DESCRIPTION OF EMBODIMENTS

Figure 1:
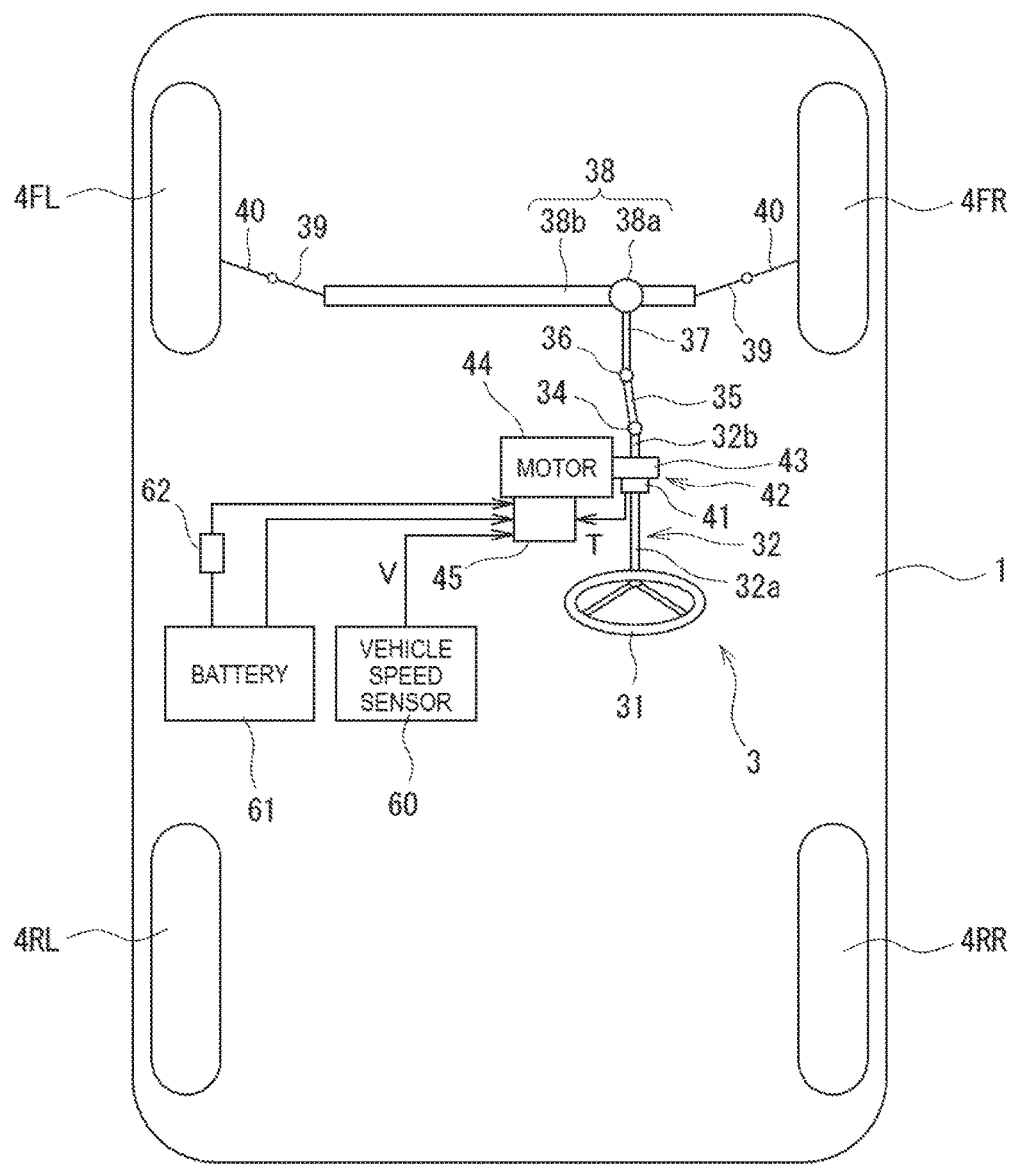
FIG. 1 is a schematic diagram illustrating a vehicle to which an electric power steering apparatus provided with a motor drive control apparatus according to a first embodiment is applied.

First to seventh embodiments of the present invention will now be described with reference to the accompanying drawings. In the following description relating to the drawings, like reference numerals denote like elements. It should be noted that the drawings are illustrated schematically so that horizontal and vertical dimensions or scales of members or parts may be different from actual ones in some cases. Therefore, specific dimensions or scales are to be determined by reading the following description sometimes. Naturally, the drawings also include some parts having dimensional relationships or scales different from each other.

The first to seventh embodiments described below are to exemplify an apparatus or method for embodying a technical idea of the invention, and are not intended to limit the technical idea of the present invention such as materials, shapes, structures, and arrangements of the elements to those described below. Various changes may be possible without departing from the spirit and scope of the invention defined in the appended claims and their equivalents.

First Embodiment

<Whole Configuration>

As illustrated in FIG. 1, a vehicle 1 according to a first embodiment has front wheels 4FR and 4FL serving as left and right steered wheels and rear wheels 4RR and 4RL. The front wheels 4FR and 4FL are steered by an electric power steering apparatus 3.

The electric power steering apparatus 3 has a steering wheel 31, a steering shaft 32, a first universal joint 34, a lower shaft 35, and a second universal joint 36.

The electric power steering apparatus 3 further has a pinion shaft 37, a steering gear 38, a tie rod 39, a knuckle arm 40, and a torque sensor 41.

A steering force applied from a driver to the steering wheel 31 is transmitted to the steering shaft 32. This steering shaft 32 has an input shaft 32a and an output shaft 32b. One end of the input shaft 32a is connected to the steering wheel 31, and the other end of the input shaft 32a is connected to one end of the output shaft 32b by interposing the torque sensor 41.

The steering force transmitted to the output shaft 32b is transmitted to the lower shaft 35 via the first universal joint 34 and is further transmitted to the pinion shaft 37 via the second universal joint 36. The steering force transmitted to the pinion shaft 37 is transmitted to the tie rod 39 via the steering gear 38. In addition, the steering force transmitted to the tie rod 39 is transmitted to the knuckle arm 40 to steer the front wheels 4FR and 4FL.

Here, the steering gear 38 is formed in a rack-and-pinion type having a pinion 38a connected to the pinion shaft 37 and a rack 38b meshing with the pinion 38a. Therefore, the steering gear 38 converts a rotational motion transmitted to the pinion 38a into a rectilinear motion in the vehicle width direction using the rack 38b.

The torque sensor 41 detects a steering torque T applied to the steering wheel 31 and transmitted to the input shaft 32a.

A steering assistance mechanism 42 that transmits a steering assistance force to the output shaft 32b is connected to the output shaft 32b of the steering shaft 32.

The steering assistance mechanism 42 includes a reduction gear 43 having a worm gear mechanism connected to the output shaft 32b, an electric motor 44 connected to the reduction gear 43 to generate a steering assistance force, and a motor drive control apparatus 45 fixed to and supported by a housing of the electric motor 44.

The electric motor 44 is a three-phase brushless motor provided with an annular motor rotor and an annular motor stator (not shown). The motor stator includes a plurality of pole teeth protruding inward in a radial direction at equal intervals in a circumferential direction, and an exciting coil is wound around each pole tooth. The motor rotor is coaxially disposed inside the motor stator. The motor rotor includes a plurality of magnets provided equidistantly in the circumferential direction on an outer circumferential surface while facing the pole teeth of the motor stator with a slight gap (air gap).

The motor rotor is fixed to the motor rotation shaft, and each tooth of the motor stator is excited in a predetermined sequence as a three-phase alternating current flows through the coil of the motor stator via the motor drive control apparatus 45, so that the motor rotor rotates, and the motor rotation shaft rotates in synchronization with this rotation.

As the motor rotation shaft rotates, its rotational force (steering assistance force) is transmitted to the steering shaft 32 via the reduction gear 43, so that the steering shaft 32 rotates. Meanwhile, as the steering wheel 31 is steered, and the steering shaft 32 rotates, its rotational force is transmitted to the motor rotation shaft via the reduction gear 43, so that the motor rotor rotates. That is, a rotational position of the electric motor 44 and a rotational position of the steering shaft 32 have a matching relationship, so that it is possible to calculate one of the rotational positions from rotation information of the other rotational position.

The motor drive control apparatus 45 operates when power is supplied from a battery 61 serving as an in-vehicle power source. Here, a negative pole of the battery 61 is grounded. A positive pole of the battery 61 is connected to the motor drive control apparatus 45 via an ignition switch 62 (hereinafter, also referred to as "IG switch 62" in some cases) for starting the engine and is directly connected to the motor drive control apparatus 45 without using the IG switch 62.

In addition, as illustrated in FIG. 1, a steering torque T detected by the torque sensor 41 and a vehicle speed V detected by the vehicle speed sensor 60 are input to the motor drive control apparatus 45.

<Configuration of Motor Drive Control Apparatus 45>

Figure 2:
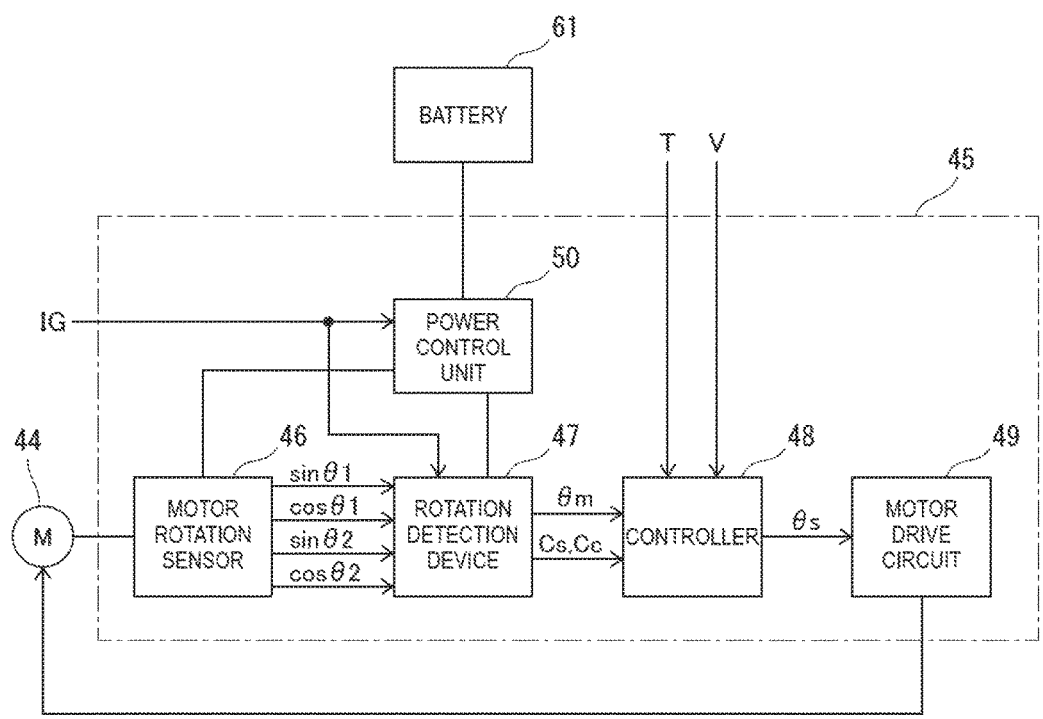
FIG. 2 is a block diagram illustrating a whole configuration of the motor drive control apparatus according to the first embodiment.

As illustrated in FIG. 2, the motor drive control apparatus 45 includes a motor rotation sensor 46, a rotation detection device 47, a controller 48, a motor drive circuit 49, and a power control unit 50.

The motor rotation sensor 46 is a magnetic sensor for detecting rotational position information of the electric motor 44. As illustrated in FIG. 3, the motor rotation sensor 46 includes a first rotational position information detector 46b and a second rotational position information detector 46c as a two-channel rotational position information detector. Note that the configuration of the motor rotation sensor 46 will be described below in more details.

Returning to FIG. 2, the rotation detection device 47 receives the first motor rotational position signal (sin θ1, cos θ1) and the second motor rotational position signal (sin θ2, cos θ2) as magnetic detection signals detected by the first and second rotational position information detectors 46b and 46c, respectively.

Hereinafter, the first motor rotational position signal (sin θ1, cos θ1) and the second motor rotational position signal (sin θ2, cos θ2) may be abbreviated as "sin θ1", "cos θ1" "sin θ2", and "cos θ2" in some cases.

Figure 4:
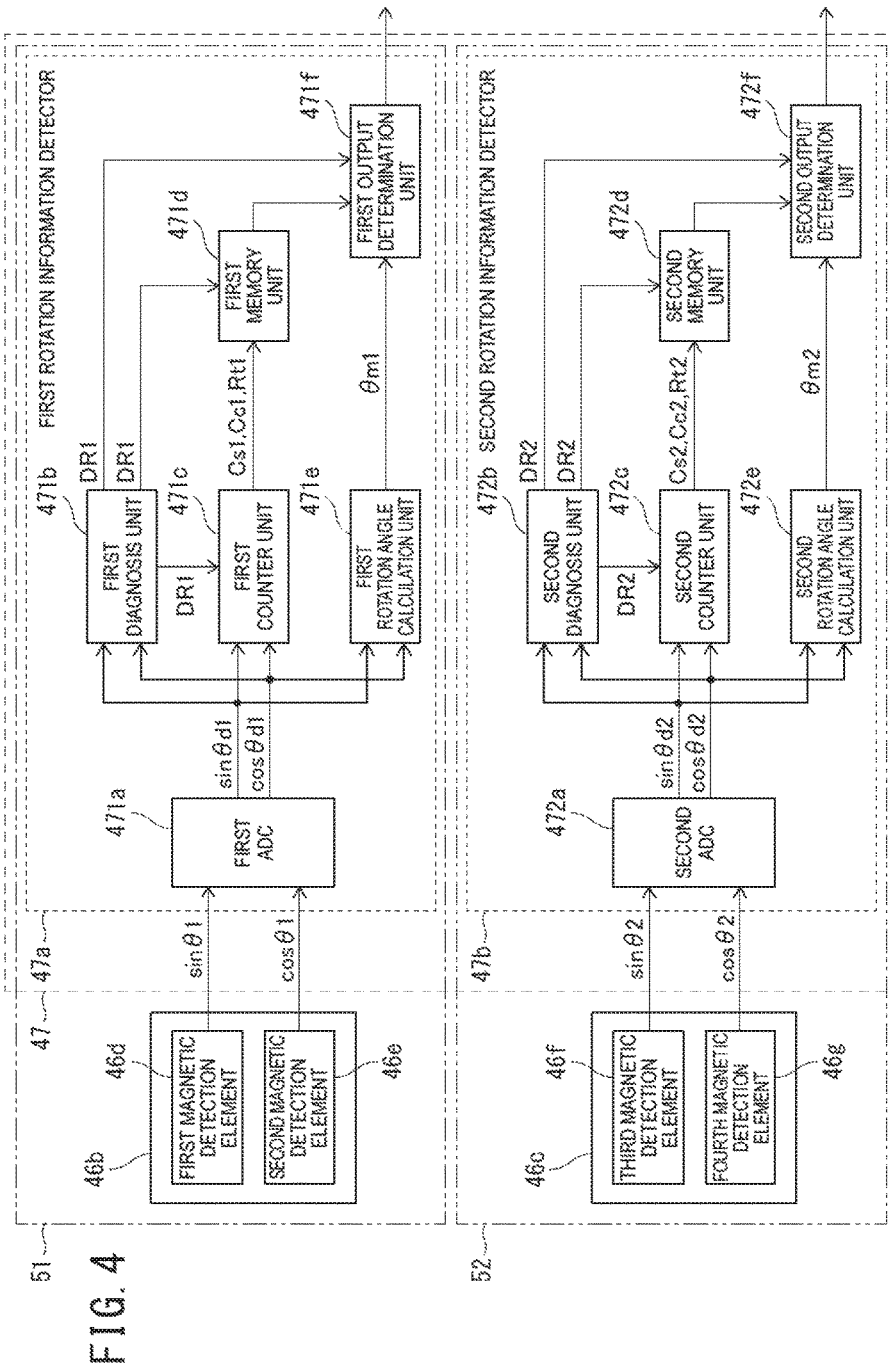
FIG. 4 is a block diagram illustrating a specific configuration example of a rotation information detection function unit according to the first embodiment.

As illustrated in FIG. 4, the rotation detection device 47 has first and second rotation information detectors 47a and 47b in two channels to perform an abnormality diagnosis process of the motor rotational position signals, a process of calculating a motor rotation angle θm, a process of measuring a change amount of the motor rotation position, and the like on the basis of the received first motor rotational position signal (sin θ1, cos θ1) and the received second motor rotational position signal (sin θ2, cos θ2). The configuration of the rotation detection device 47 will be described below in more details.

Here, the rotation detecting device 47 according to the first embodiment is configured so as to continuously measure the change amount of the motor rotation position even during the OFF state of the IG switch 62.

Returning to FIG. 2, the controller 48 drives and controls the electric motor 44 by controlling the motor drive circuit 49 on the basis of the steering torque T, the vehicle speed V, the motor rotation angle θm from the rotation detection device 47, and the change amount of the motor rotation position.

Specifically, in a case where the steering assistance control is performed, the controller 48 calculates steering assistance command values (steering assistance torque command values) for generating a steering assistance torque using the electric motor 44 depending on the steering torque T, the vehicle speed V, and the motor rotation angle θm in a sequence as known in the art, and calculates a first current command value Iref1 for a steering assistance control on the basis of the calculated steering assistance command value. In addition, the controller 48 drives and controls the electric motor 44 by controlling the motor drive circuit 49 on the basis of the calculated first current command value Iref1.

In this case, the controller 48 according to the first embodiment determines whether or not an abnormality occurs in the first motor rotational position signal (sin θ1, cos θ1) and the second motor rotational position signal (sin θ2, cos θ2) on the basis of abnormality diagnosis results of each of the first and second rotation information detectors 47a and 47b of two channels of the rotation detection device 47. Then, when it is determined that an abnormality occurs in any one of the first and second motor rotational position signals, the steering assistance control is performed on the basis of the motor rotation angle of any one having no abnormality out of the first motor rotation angle θm1 calculated from the first motor rotational position signals (sin θ1, cos θ1) and the second motor rotation angle θm2 calculated from the second motor rotational position signal (sin θ2, cos θ2).

Meanwhile, the controller 48 calculates (estimates) the rotational position θs (hereinafter, sometimes referred to as a "steering angle θs") of the steering shaft 32 on the basis of the motor rotation angle θm from the rotation detection device 47 during the ON state of the IG switch 62.

However, when the IG switch 62 is switched from the OFF state to the ON state, the controller 48 according to the first embodiment calculates the steering angle θs at the time of switching from the OFF state to the ON state on the basis of the steering angle θs and the change amount of the motor rotation position (count values Cs and Cc described below)

immediately before the OFF state and the change amount of the motor rotation position immediately after switching to the ON state stored in a nonvolatile memory (not shown) in advance.

In a case where an automatic drive control is performed in response to a command from an automatic drive control device (not shown), the controller 48 calculates a second current command value Iref2 for the automatic drive control on the basis of a target steering angle θs* from the automatic drive control device, the calculated steering angle θs, and the motor rotation angle θm from the rotation detection device 47. In addition, the controller 48 controls the motor drive circuit 49 on the basis of the calculated second current command value Iref2 to drive and control the electric motor 44.

Although not shown in the drawings, the motor drive circuit 49 has a three-phase inverter circuit to drive the three-phase inverter circuit on the basis of a drive signal from the controller 48 (for example, the PWM signal) to supply a motor drive current to the electric motor 44.

The power control unit 50 is directly connected to the battery 61 and is also connected to the IG switch 62. The power control unit 50 receives a signal representing the ON state or the OFF state of the IG switch 62 (hereinafter, sometimes referred to as an "IG signal" or "IG") from the IG switch 62. In addition, the power control unit 50 receives the first motor rotational position signal (sin θ1, cos θ1) and the second motor rotational position signal (sin θ2, cos θ2) from the motor rotation sensor 46.

When it is determined that the IG switch 62 is in the ON state on the basis of the IG signal, the power control unit 50 performs a control for continuously supplying the power from the battery 61 to the first and second rotational position information detectors 46b and 46c, and the rotation detection device 47 without an interval during the ON state of the IG switch 62.

Hereinafter, the power supply state in which the power is continuously supplied from the battery 61 may be referred to as a "normal supply state" in some cases.

Meanwhile, when it is determined that the IG switch 62 is in the OFF state, the power control unit 50 performs a control for intermittently supplying the power from the battery 61 to the first and second rotational position information detectors 46b and 46c, and the rotation detection device 47 on the basis of the first motor rotational position signal (sin θ1, cos θ1) and the second motor rotational position signal (sin θ2, cos θ2) with an interval set in advance. Note that the configuration of the power control unit 50 will be described below in more details.

<Configuration of Motor Rotation Sensor 46>

Next, a specific configuration of the motor rotation sensor 46 will be described with reference to FIG. 3.

As illustrated in FIG. 3A, the motor rotation sensor 46 according to the first embodiment is provided in a stator end position of the reduction gear 43 side of motor rotation shaft 44a placed inside the motor stator of the electric motor 44.

Specifically, as illustrated in FIG. 3B, the motor rotation sensor 46 includes a multipolar ring magnet 46a, a first rotational position information detector 46b, and a second rotational position information detector 46c.

The multipolar ring magnet 46a is an annular (ring-shaped) multipolar magnet having an S pole and an N pole alternatingly and continuously magnetized on an outer peripheral surface along a circumferential direction and is fixedly supported by the motor rotation shaft 44a. This multipolar ring magnet 46a is fixedly supported inside the motor stator coaxially with the motor rotation shaft 44a while the motor rotation shaft 44a is inserted into a center through-hole. As a result, the multipolar ring magnet 46a is also rotated in synchronization with the rotation of the motor rotation shaft 44a.

Note that the multipole ring magnet 46a is magnetized by sinusoidal magnetization so that a magnetic flux density distribution on each magnetic pole surface is sinusoidal.

The first rotational position information detector 46b includes a first magnetic detection element 46d and a second magnetic detection element 46e. The first and second magnetic detection elements 46d and 46e are arranged to face each other with a predetermined gap on an outer circumferential surface of the multipolar ring magnet 46a and are provided in parallel along a circumferential direction of the multipolar ring magnet 46a with an interval set such that their electric angles have a phase difference of 90°.

The second rotational position information detector 46c includes a third magnetic detection element 46f and a fourth magnetic detection element 46g. The third and fourth magnetic detection elements 46f and 46g are arranged to face each other with a predetermined gap on the outer circumferential surface of the multipolar ring magnet 46a and are provided in parallel along the circumferential direction of the multipolar ring magnet 46a with an interval set such that their electric angles have a phase difference of 90°.

In this configuration, the first rotational position information detector 46b can detect a magnetic flux of the multipolar ring magnet 46a changing depending on a rotational position of the motor rotation shaft 44a as a magnetic detection signal having sine and cosine waveforms (the first motor rotational position signal (sin θ1, cos θ1)). In addition, the second rotational position information detector 46c can detect a magnetic flux of the multipolar ring magnet 46a changing depending on a rotational position of the motor rotation shaft 44a as a magnetic detection signal having sine and cosine waveforms (the second motor rotational position signal (sin θ2, cos θ2)). Note that, when the first and second rotational position information detectors 46b and 46c have a normal state, the first motor rotational position signal (sin θ1, cos θ1) is equal to the second motor rotational position signal (sin θ2, cos θ2).

That is, the motor rotation sensor 46 according to the first embodiment has a two-channel rotational position information detector.

Note that, although the motor rotation sensor 46 of FIGS. 3A and 3B has the first and second rotational position information detectors 46b and 46c arranged to face each other with a predetermined gap on the outer circumferential surface of the multipolar ring magnet 46a with respect to the multipolar ring magnet 46a, the present invention is not limited to this configuration.

For example, as illustrated as the motor rotation sensor 46' in FIG. 3C, the first and second rotational position information detectors 46b and 46c may be arranged to face each other with a predetermined gap on an end surface of an axial direction of the multipolar ring magnet 46a.

In addition, without limiting to the configurations of FIGS. 3A to 3C, for example, the motor rotation sensor may be configured to use a motor rotation sensor 53 of FIG. 3D.

This motor rotation sensor 53 includes a bipolar magnet 53a and a third rotational position information detector 53b.

The bipolar magnet 53a is a disk-shaped magnet having an end surface of the axial direction magnetized to a pair of poles including the S pole and the N pole. The bipolar magnet 53a is fixedly supported by the motor rotation shaft 44a while an end portion opposite to the reduction gear 43 of the motor rotation shaft 44a is inserted to a hollow provided in a center of a surface opposite to the magnetized surface coaxially with the bipolar magnet 53a. As a result, the bipolar magnet 53a is also rotated in synchronization with the rotation of the motor rotation shaft 44a.

The third rotational position information detector 53b is arranged to face the other end surface of the axial direction of the bipolar magnet 53a with a predetermined gap. Similar to the motor rotation sensor 46, the third rotational position information detector 53b has a two-channel rotational position information detector (not shown) so that it can detect the first motor rotational position signal (sin θ1, cos θ1) and the second motor rotational position signal (sin θ2, cos θ2) in a similar way to that of the motor rotation sensor 46.

<Configuration of Rotation Detection Device 47>

Next, a specific configuration of the rotation detection device 47 will be described with reference to FIG. 4.

As illustrated in FIG. 4, the rotation detection device 47 includes a first rotation information detector 47a and a second rotation information detector 47b.

The first rotational position information detector 46b and the first rotation information detector 47a constitute a first rotation information detection function unit 51, and the second rotational position information detector 46c and the second rotation information detector 47b constitute a second rotation information detection function unit 52. That is, the motor drive control apparatus 45 according to the first embodiment includes a two-channel rotation information detection function unit.

The first rotation information detector 47a includes a first analog-to-digital converter (ADC) 471a, a first diagnosis unit 471b, a first counter unit 471c, a first memory unit 471d, a first rotation angle calculation unit 471e, and a first output determination unit 471f.

When the first motor rotational position signal (sin θ1, cos θ1) having an analog format is input from the first rotational position information detector 46b, the first ADC 471a converts it into the first digital rotation position signal (sin θd1, cos θd1) as the first motor rotational position signal having a digital format. In addition, the first ADC 471a outputs the first digital rotation position signal (sin θd1, cos θd1) to each of the first diagnosis unit 471b, the first counter unit 471c, and the first rotation angle calculation unit 471e.

Hereinafter, the first digital rotation position signal (sin θd1, cos θd1) may be abbreviated to a "first digital rotation position signal" or individually "sin θd1" and "cos θd1."

The first diagnosis unit 471b diagnoses whether or not an abnormality occurs in the first digital rotation position signal on the basis of the first digital rotation position signal. In addition, the first diagnosis unit 471b sets a first diagnosis result flag DR1 representing a result of the diagnosis and outputs the set first diagnosis result flag DR1 to the first counter unit 471c, the first memory unit 471d, and the first output determination unit 471f.

Specifically, the first diagnosis unit 471b diagnoses whether or not there is an abnormality in the first digital rotation position signal on the basis of the following Equation (1).

$$\sin \theta d^2 + \cos \theta d^2 = 1 \qquad (1)$$

That is, when squares of the sine and cosine signals are obtained, both signals have the same waveform while their phases are inverted, so that the aforementioned Equation (1) is satisfied. As a result, when the signals sin θd1 and cos θd1 are normal, a sum of their square values "sin θd1$^2$+cos θd1$^2$" becomes "1"

Therefore, when the sum of the square values of sin θd1 and cos θd1 becomes "1" it is possible to diagnose that an abnormality does not occur in the first digital rotation position signal (normal state). In addition, when the sum of the square values becomes a numerical value other than "1" it is possible to diagnose that an abnormality occurs.

When it is diagnosed that the first digital rotation position signal is normal, the first diagnosis unit 471b sets the first diagnosis result flag DR1 to "0" In contrast, when it is diagnosed that the first digital rotation position signal is abnormal, the first diagnosis unit 471b sets the first diagnosis result flag DR1 to "1"

The first counter unit 471c counts these values for each quadrant of the signals sin θd1 and cos θd1 and outputs their count values, that is, a first sine count value Cs1 and a first cosine count value Cc1 to the first memory unit 471d.

Hereinafter, the first sine count value Cs1 and first cosine count value Cc1 may be abbreviated to "first count values Cs1 and Cc1" in some cases.

The first counter unit 471c calculates a first rotation count Rt1 on the basis of a count number of a single cycle set in advance, and the first count values Cs1 and Cc1. In addition, the calculated first rotation count Rt1 is output to the first memory unit 471d.

The first counter unit 471c is configured to stop its operation when the first diagnosis result flag DR1 input from the first diagnosis unit 471b has a value "1"

The first memory unit 471d has a nonvolatile memory (not shown) to store the first count values Cs1 and Cc1 and the first rotation count Rt1 input from the first counter unit 471c in the nonvolatile memory. Hereinafter, the first count values Cs1 and Cc1 and first rotation count Rt1 may be abbreviated to "first rotational displacement information" in some cases.

The first memory unit 471d is configured to stop its operation when the first diagnosis result flag DR1 input from the first diagnosis unit 471b has a value "1"

The first rotation angle calculation unit 471e calculates the first motor rotation angle θm1 on the basis of the first digital rotation position signal from the first ADC 471a. In addition, the first rotation angle calculation unit 471e outputs the calculated first motor rotation angle θm1 to the first output determination unit 471f.

The first output determination unit 471f outputs the first diagnosis result flag DR1 and the first motor rotation angle θm1 input from the first rotation angle calculation unit 471e to the controller 48 when the first diagnosis result flag DR1 input from the first diagnosis unit 471b has a value "0" In addition, when the IG switch 62 becomes the ON state from the OFF state, the first output determination unit 471f outputs the first rotational displacement information stored in the first memory unit 471d to the controller 48. Furthermore, during the OFF state of the IG switch 62, the first output determination unit 471f outputs the first count values Cs1 and Cc1 to the power control unit 50.

Meanwhile, when the first diagnosis result flag DR1 has a value "1" the first output determination unit 471f stops outputting the first motor rotation angle θm1 and first rotational displacement information and outputs only the first diagnosis result flag DR1 to the controller 48.

Meanwhile, the second rotation information detector 47b includes a second ADC 472a, a second diagnosis unit 472b, a second counter unit 472c, a second memory unit 472d, a second rotation angle calculation unit 472e, and a second output determination unit 472f.

When the second motor rotational position signal (sin θ2, cos θ2) having an analog format is input from the second rotational position information detector 46c, the second ADC 472a converts it into the second digital rotation position signal (sin θd2, cos θd2) as a second motor rotational position signal having a digital format. In addition, the second ADC 472a outputs the second digital rotation position signal (sin θd2, cos θd2) to each of the second diagnosis unit 472b, the second counter unit 472c, and the second rotation angle calculation unit 472e.

Hereinafter, the second digital rotation position signal (sin θd2, cos θd2) may be simply abbreviated to "a second digital rotation position signal" or individually "sin θd2" and "cos θd2" in some cases.

Note that the second diagnosis unit 472b, the second counter unit 472c, the second memory unit 472d, the second rotation angle calculation unit 472e, and the second output determination unit 472f perform the same operations as those of the first diagnosis unit 471b, the first counter unit 471c, the first memory unit 471d, first rotation angle calculation unit 471e, and the first output determination unit 471f, respectively, except that the treated signals are different. For this reason, they will not be described repeatedly.

A flag representing a diagnosis result of the second diagnosis unit 472b is set as a second diagnosis result flag DR2, and a count value of the second counter unit 472c is set as a second sine count value Cs2 and a second cosine count value Cc2. The rotation count based on these count values and a count number of a single cycle is set as a second rotation count Rt2, and the motor rotation angle calculated by the second rotation angle calculation unit 472e is set as a second motor rotation angle θm2.

Hereinafter, the second sine count value Cs2 and second cosine count value Cc2 may be abbreviated to "second count values Cs2 and Cc2" in some cases. In addition, the second count values Cs2 and Cc2 and second rotation count Rt2 may be abbreviated to "second rotational displacement information" in some cases.

Using the aforementioned configurations of the first and second rotation information detection function units 51 and 52, the controller 48 can recognize that an abnormality occurs in the first rotation information detection function unit 51 when the first diagnosis result flag DR1 has a value "1" In addition, the controller 48 can recognize that an abnormality occurs in the second rotation information detection function unit 52 when the second diagnosis result flag DR2 has a value "1" That is, it is possible to specify which one of the first and second rotation information detection function units 51 and 52 is abnormal.

Note that the controller 48 according to the first embodiment is configured to inform an abnormality to a driver by blinking an alarm lamp (not shown) and displaying an alarm message on a display unit of a car navigation (not shown) when an abnormality is detected.

The first and second rotation information detectors 47a and 47b according to the first embodiment are configured independently. For example, the first and second rotation information detectors 47a and 47b are configured independently using an application specific integrated circuit (ASIC) which is an integrated circuit designed and produced for a specific dedicated purpose, a field programmable gate array (FPGA) which is an integrated circuit that can allow a consumer or designer to set a configuration after manufacturing, and the like. Therefore, even when any one of the first and second rotation information detectors 47a and 47b is abnormal, the other one can operate independently without being influenced by the abnormality.

The first and second rotation information detection function units 51 and 52 are intermittently supplied with power from the battery 61 via the power control unit 50 even when the IG switch 62 becomes an OFF state. For this reason, it is possible to continuously perform a process of detecting the first and second motor rotational position signals, an AD conversion process of the first and second motor rotational position signals, a process of counting the first and second digital rotation position signals, a process of calculating the rotation count, and a process of storing the rotation information even during the OFF state of the IG switch 62.

As a result, it is possible to track a change of the motor rotation position even when the steering wheel 31 is steered during the OFF state of the IG switch 62. Therefore, the controller 48 can calculate the accurate steering angle θs on the basis of the first rotational displacement information and the second rotational displacement information input from the first rotation information detection function unit 51 and the second rotation information detection function unit 52 when the IG switch 62 is changed from the OFF state to the ON state.

<Configuration of Power Control Unit 50>

Next, a specific configuration of the power control unit 50 will be described with reference to FIG. 5.

Figure 5:
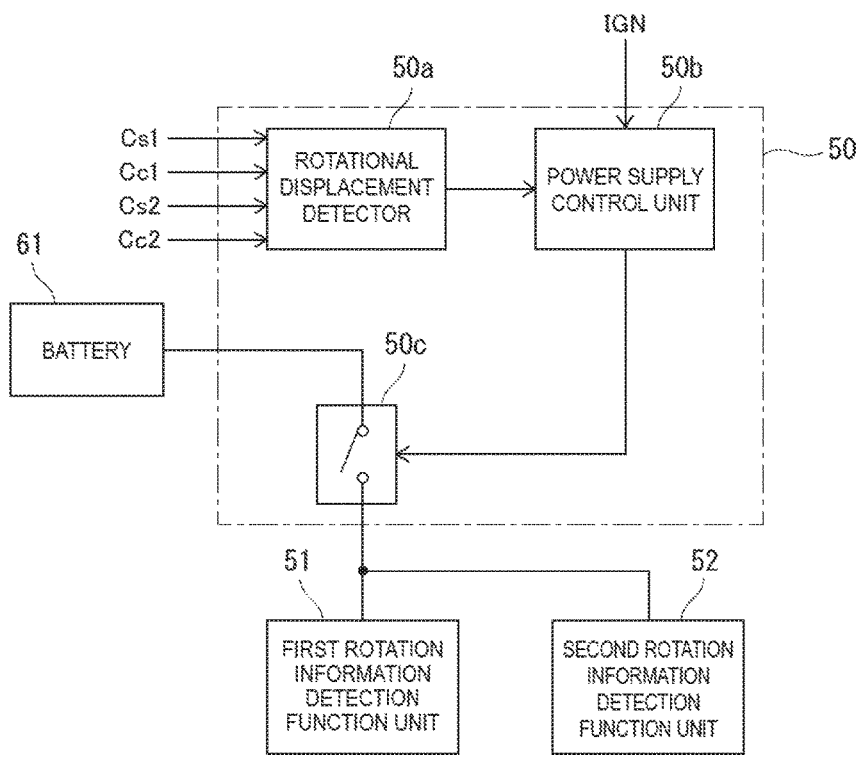
FIG. 5 is a block diagram illustrating a specific configuration of a power control unit according to the first embodiment.

As illustrated in FIG. 5, the power control unit 50 includes a rotational displacement detector 50a, a power supply control unit 50b, and a first changeover switch 50c.

The rotational displacement detector 50a calculates a rotational displacement on the basis of the first count values Cs1 and Cc1 and the second count values Cs2 and Cc2 input from the first rotation information detector 47a and the second rotation information detector 47b. Specifically, the rotational displacement detector 50a calculates a rotational position of the previous drive operation and a rotational position of the current drive operation on the basis of each count value and calculates a difference between the previous rotational position and the current rotational position as a rotational displacement. In addition, the rotational displacement detector 50a outputs the calculated rotational displacement to the power supply control unit 50b.

When the IG switch 62 is in the ON state, the power supply control unit 50b performs a control for continuously supplying the power from the battery 61 to the first and second rotation information detection function units 51 and 52 on the basis of the IGN signal input from the IG switch 62 without an interval.

Specifically, the power supply control unit 50b outputs a changeover control signal for continuously maintaining (fixing) the first changeover switch 50c in the ON state to the first changeover switch 50c during the ON state of the IG switch 62.

Hereinafter, a power supply state in which the power is continuously supplied from the battery 61 may be referred to as a "normal supply state" in some cases.

Meanwhile, when it is determined that the IG switch 62 is in the OFF state, a control is performed such that the power is intermittently supplied from the battery 61 to the first and second rotation information detection function units 51 and 52. That is, the power consumption during the OFF state of the IG switch 62 is reduced by intermittently supplying the power.

Specifically, when it is determined that the IG switch 62 is in the OFF state, the power supply control unit 50b outputs a changeover control signal alternatingly and repeatedly switching between ON and OFF states to the first changeover switch 50c such that the first changeover switch 50c is in the ON state only for a supply time Tc set in advance at every first interval X1 set in advance.

Hereinafter, a power supply state in which the power from the battery 61 is intermittently supplied at the first interval X1 may be referred to as a "first intermittent supply state" in some cases.

Meanwhile, the power supply control unit 50b determines whether or not the motor rotation number is equal to or higher than a preset rotation number cot set in advance on the basis of the rotational displacement input from the rotational displacement detector 50a during the first intermittent supply state. That is, a relationship between the rotational displacement and the motor rotation number is investigated in advance, and it is determined whether or not the rotational displacement is equal to or larger than a change corresponding to the preset rotation number wt. Then, it is assumed that it is determined that the motor rotation number is equal to or higher than the preset rotation number wt. In this case, while the motor rotation number is equal to or higher than the preset rotation number cot, the power supply control unit 50b outputs the changeover control signal alternatingly and repeatedly switching between ON and OFF states to the first changeover switch 50c, such that the first changeover switch 50c is in the ON state only for a supply time Tc at every second interval X2 shorter than the first interval X1 set in advance.

Hereinafter, a power supply state in which the power from the battery 61 is intermittently supplied at the second interval X2 may be referred to as a "second intermittent supply state" in some cases.

That is, when it is determined that the motor rotation number (rpm) is equal to or higher than the preset rotation number ωt during the OFF state of the IG switch 62 and during the first intermittent supply state, the power supply state for the first and second rotation information detection function units 51 and 52 is changed from the first intermittent supply state to the second intermittent supply state. In addition, when it is determined that the motor rotation number is lower than the preset rotation number ωt during the second intermittent supply state after the change, the power supply state is changed from the second intermittent supply state to the first intermittent supply state. For example, it is assumed that a driver steers the steering wheel 31 during the first intermittent supply state so that the motor rotation number becomes equal to or higher than the preset rotation number wt. In this case, the interval for supplying power from the battery 61 is set to be shorter than the first interval in order to more securely follow a change of the motor rotation position.

Here, the values of the first and second intervals X1 and X2 for intermittently supplying power for the constant supply time Tc are determined on the basis of a capacity of the battery 61 (dark current) and a maximum rotation speed of the steering wheel 31. That is, when the interval for which power is not supplied is too long, it may be difficult to follow the change of the motor rotation position. Therefore, the interval is set to be sufficiently long to follow a change of the motor rotation position. According to the first embodiment, the value of the first interval X1 is determined such that it can follow a change lower than the preset rotation number wt. In addition, the value of the second interval X2 is determined such that it can follow a change equal to or higher than the preset rotation number wt.

The first changeover switch 50c is a switch for switching between conduction and non-conduction states of the power from the battery 61 to the first and second rotation information detection function units 51 and 52. The first changeover switch 50c includes, for example, a power transistor. The first changeover switch 50c has a conduction state during the ON state and has a non-conduction state during the OFF state. The first changeover switch 50c is inserted into a power supply line between all components of the first and second rotation information detection function units 51 and 52 and the battery 61. In addition, the power is conducted to all of the components during the ON state, and the power is not conducted to all of the components during the OFF state.

<Operation>

Next, operations according to the first embodiment will be described with reference to FIGS. 6 and 7.

It is now assumed that the IG switch 62 is in the ON state, and the power from the battery 61 is supplied to the first and second rotation information detection function units 51 and 52 via the power control unit 50 in the normal supply state.

In this state, the first and second rotational position information detectors 46b and 46c detect the first and second motor rotational position signals depending on the motor rotation position and inputs the detected first and second motor rotational position signals to the first and second rotation information detectors 47a and 47b.

As a result, the first and second rotation information detectors 47a and 47b convert the first and second motor rotational position signals input in an analog format into the first and second digital rotation position signals having the digital format, in the first and second ADC471a and 472a.

In addition, the first and second rotation information detectors 47a and 47b output the converted first and second digital rotation position signal to the first and second diagnosis units 471b and 472b, the first and second counter units 471c and 472c, and the first and second rotation angle calculation units 471e and 472e.

Subsequently, the first and second diagnosis units 471b and 472b calculate "$\sin \theta d1^2 + \cos \theta d1^2$" and "$\sin \theta d2^2 + \cos \theta d2^2$" from the input first and second digital rotation position signals on the basis of the aforementioned Equation (1) to determine whether or not the calculation result becomes "1"

Here, assuming that all of the calculation results become "1" the first and second diagnosis units 471b and 472b output the first and second diagnosis result flags DR1 and DR2 set to "0" to each of the first and second counter units 471c and 472c, the first and second memory units 471d and 472d, and the first and second output determination units 471f and 472f.

The first and second counter units 471c and 472c count the input first and second digital rotation position signals for each quadrant. In addition, the first and second counter units 471c and 472c calculate the first rotation count Rt1 and the second rotation count Rt2 on the basis of these count values and the count number of a single cycle. In addition, the first and second counter units 471c and 472c output the first rotational displacement information including the first count values Cs1 and Cc1 and the first rotation count Rt1 to the first memory unit 471d and output the second rotational displacement information including the second count value Cs2 and Cc2 and the second rotation count Rt2 to the second memory unit 472d.

The first memory unit 471d stores the input first rotational displacement information in a nonvolatile memory of itself, and the second memory unit 472d stores the input second rotational displacement information in a nonvolatile memory of itself.

The first and second rotation angle calculation units 471e and 472e calculate the first and second motor rotation angles θm1 and θm2 from the input first and second digital rotation position signals, outputs the first motor rotation angle θm1 to the first output determination unit 471*f*, and outputs the second motor rotation angle θm2 to the second output determination unit 472*f*.

The first and second output determination units 471*f* and 472*f* output the first and second diagnosis result flags DR1 and DR2 and the input first and second motor rotation angles θm1 and θm2 to the controller 48 because the input first and second diagnosis result flags DR1 and DR2 are set to "0"

The controller 48 determines that an abnormality does not occur in both the first and second rotation information detection function units 51 and 52 (they are normal) on the basis of the first and second diagnosis result flags DR1 and DR2 input from the first and second rotation information detection function units 51 and 52.

The controller 48 calculates the steering angle θs on the basis of one of the input first and second motor rotation angles θm1 and θm2, that is, the first motor rotation angle θm1 here. In addition, in a case where a steering assistance control is performed, the electric motor 44 is driven and controlled on the basis of the first motor rotation angle θm1. In a case where an automatic drive control is performed, the electric motor 44 is driven and controlled on the basis of the calculated steering angle θs and the first motor rotation angle θm1.

Then, when the IG switch 62 becomes the OFF state from the ON state, the power control unit 50 changes the power supply state of the power supplied from the battery 61 to the first and second rotation information detection function units 51 and 52 from the normal supply state to the first intermittent supply state.

Figure 6:
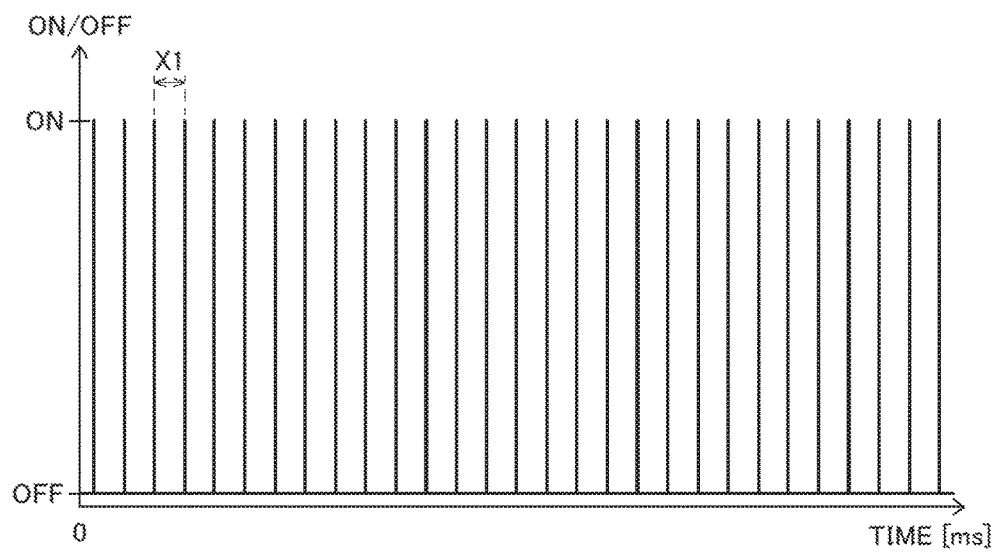
FIG. 6 is a waveform diagram illustrating a first example of a power supply control when an ignition switch according to the first embodiment is in an OFF state.

Specifically, as illustrated in FIG. 6, the power control unit 50 alternatingly and repeatedly switches on and off the first changeover switch 50*c* only for a supply time Tc (1 [ms] in the example of FIG. 6) at each first interval X1 (having the OFF state for 99 [ms] in the example of FIG. 6). As a result, the power supply state of the power supplied from the battery 61 to the first and second rotation information detection function units 51 and 52 is changed to the first intermittent supply state.

As a result, during the first intermittent supply state, the first and second motor rotational position signals having an analog format are continuously input to the first and second ADCs 471*a* and 472*a* at every first interval X1, and these signals are converted into the first and second digital rotation position signals having a digital format. In addition, the first and second diagnosis units 471*b* and 472*b* diagnose the first and second digital rotation position signals. Furthermore, the first and second rotation angle calculation units 471*e* and 472*e* calculate the first and second motor rotation angle θm1 and θm2.

Here, it is assumed that the first and second digital rotation position signals are not abnormal, and the first and second diagnosis result flags DR1 and DR2 are set to "0"

As a result, during the first intermittent supply state, the count process and the rotation count calculation process of the first and second counter units 471*c* and 472*c* are continuously performed for the rotational displacement lower than the preset rotation number ωt at every first interval X1. In addition, the process of storing the rotation information in the first and second memory units 471*d* and 472*d* is continuously performed.

For example, in this case, it is assumed that a driver riding on the vehicle 1 having a so-called idling stop function, in which an engine automatically stops when the vehicle stops, steers the steering wheel 31, and the motor rotation shaft 44*a* is rotated by this steering during the OFF state of the IG switch 62 by virtue of the idling stop function under a signaling standby situation.

In this manner, even when the steering wheel 31 is steered during the OFF state of the IG switch 62, the first and second counter units 471*c* and 472*c* can count the values depending on a change of the first and second digital rotation position signals and can calculate the rotation count on the basis of these count values. In addition, the first and second memory units 471*d* and 472*d* can also store the first rotational displacement information and the second rotational displacement information during the OFF state of the IG switch 62.

The power control unit 50 calculates rotational displacement from the first count value Cs1 and Cc1 and the second count value Cs2 and Cc2 input from the first and second rotation information detectors 47*a* and 47*b* during the first intermittent supply state. In addition, the power control unit 50 determines whether or not the motor rotation number is equal to or higher than the preset rotation number ωt (for example, 50 [rpm]) on the basis of the calculated rotational displacement.

Here, it is assumed that a driver performs steering relatively fast, so that it is determined that the motor rotation number becomes equal to or higher than preset rotation number ωt. As a result, the power control unit 50 changes the power supply state from the current first intermittent supply state to the second intermittent supply state. That is, as illustrated in FIG. 7, the first changeover switch 50*c* is alternatingly and repeatedly switched on and off such that it is in the ON state only for a supply time Tc (1 [ms] in the example of FIG. 7) at every second interval X2 (OFF state for 1 [ms] in the example of FIG. 7). As a result, the power supply state of the power supplied from the battery 61 to the first and second rotation information detection function units 51 and 52 is changed from the first intermittent supply state to the second intermittent supply state.

Figure 7:
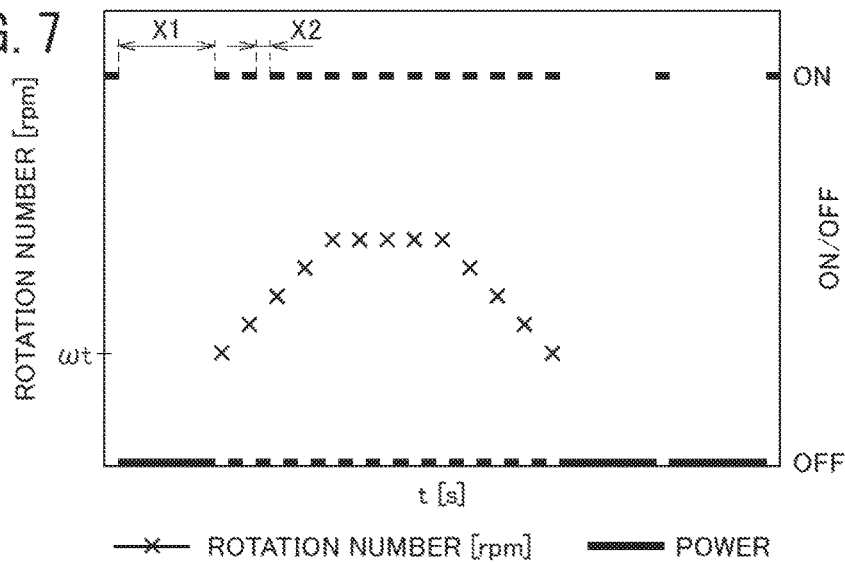
FIG. 7 is a waveform diagram illustrating a second example of a power supply control when the IG switch according to the first embodiment is in an OFF state.

Note that, in FIG. 7, the cross marks indicate the motor rotation numbers [rpm] corresponding to the power supply timings, and the thick straight lines and the thick dotted lines indicate the ON and OFF (conduction and non-conduction) states of the first changeover switch 50*c*.

As a result, in a case where a driver performs steering becomes equal to or higher than the preset rotation number ωt during the OFF state of the IG switch 62, the first and second counter units 471*c* and 472*c* can count the values depending on the change of the first and second digital rotation position signal during the power supply state using the second interval X2 shorter than the first interval X1. In addition, it is possible to calculate the rotation count on the basis of these count values. Furthermore, the first and second memory units 471*d* and 472*d* can store the first rotational displacement information and the second rotational displacement information.

Subsequently, when the motor rotation number decreases to be lower than the preset rotation number ωt during the OFF state of the IG switch 62, the power control unit 50 changes the power supply state from the current second intermittent supply state to the first intermittent supply state.

Then, it is assumed that the signal becomes blue, and the idling stop is released, so that the IG switch 62 is changed from the OFF state to the ON state. As the IG switch 62 is changed from the OFF state to the ON state, the power control unit 50 changes the power supply state from the current first intermittent supply state to the normal supply state.

The first and second output determination units 471f and 472f outputs, to the controller 48, the first rotational displacement information and the second rotational displacement information stored in the first and second memory units 471d and 472d in addition to the first and second diagnosis result flags DR1 and DR2 and the first and second motor rotation angles θm1 and θm2

The controller 48 calculates the steering angle θs on the basis of the input first and second rotational displacement information and drives and controls the electric motor 44 on the basis of the calculated steering angle θs and the input first and second motor rotation angles θm1 and θm2 to perform the automatic drive control.

Subsequently, it is assumed that the same process as that of the normal supply state is performed, so that the first and second diagnosis units 471b and 472b set the first diagnosis result flag DR1 to "1" and set the second diagnosis result flag DR2 to "0" That is, a value "1" representing an abnormality is input to the first counter unit 471c, the first memory unit 471d, and the first output determination unit 471f as the first diagnosis result flag DR1.

As a result, the first counter unit 471c and first memory unit 471d stop the operation.

In addition, the first output determination unit 471f stops outputting the first motor rotation angle θm1 and the first count values Cs1 and Cc1 and outputs only the first diagnosis result flag DR1 (=1) to the controller 48.

Meanwhile, the second rotation information detection function unit 52 is normally operated to output the second diagnosis result flag DR2 (=0) and the second motor rotation angle θm2 to the controller 48.

The controller 48 determines that the first rotation information detection function unit 51 is abnormal on the basis of the input first diagnosis result flag DR1 (=1), and determines that the second rotation information detection function unit 52 is normal on the basis of the input second diagnosis result flag DR2 (=0). In addition, the controller 48 drives and controls the electric motor 44 using the second motor rotation angle θm2 input from the second rotation information detection function unit 52 determined as being normal.

Here, the multipolar ring magnet 46a corresponds to a ring-shaped magnet, and the first and second rotational position information detectors 46b and 46c correspond to a rotational position information detector.

The first and second counter units 471c and 472c, the first and second memory units 471d and 472d, and the first and second rotation angle calculation units 471e and 472e correspond to a rotation information detector.

The first and second counter units 471c and 472c and the first and second memory units 471d and 472d correspond to a rotation information measurement unit. The first and second rotation angle calculation units 471e and 472e correspond to a rotation angle detector.

The first and second diagnosis units 471b and 472b correspond to a rotational position information diagnosis unit, and the controller 48 and the motor drive circuit 49 correspond to a motor drive control unit. In addition, the first and second rotation information detection function units 51 and 52 correspond to a rotation information detection function unit.

Advantageous Effects of First Embodiment (1) The motor drive control apparatus 45 according to the first embodiment is provided rotatably in synchronization with the motor rotation shaft 44a of the electric motor 44 that applies a steering assistance force to the steering shaft 32 and has a ring-shaped multipolar ring magnet 46a in which two or more different magnetic poles are arranged alternatingly along the circumferential direction.

The motor drive control apparatus 45 has a two-channel rotation information detection function unit including the first rotation information detection function unit 51 and the second rotation information detection function unit 52.

In the first rotation information detection function unit 51, the first rotational position information detector 46b detects a magnetic flux of the multipolar ring magnet 46a that changes depending on a rotational position of the motor rotation shaft 44a as rotational position information (first motor rotational position signal (sin θ1, cos θ1)) using first and second magnetic detection elements 46d and 46e. The first rotation angle calculation unit 471e calculates the first motor rotation angle θm1 on the basis of the rotational position information detected by the first rotational position information detector 46b. Furthermore, the first counter unit 471c and the first memory unit 471d measure the first count value Cs1 and Cc1 as a change amount of the rotational position of the electric motor 44 and the first rotation count as Rt1 a rotation count of the electric motor 44.

In the second rotation information detection function unit 52, the second rotational position information detector 46c detects a magnetic flux of the multipolar ring magnet 46a that changes depending on a rotational position of the motor rotation shaft 44a as rotational position information (second motor rotational position signal (sin θ2, cos θ2)) using third and fourth magnetic detection elements 46f and 46g. The second rotation angle calculation unit 472e calculates the second motor rotation angle θm2 on the basis of the rotational position information detected by the second rotational position information detector 46c. The second counter unit 472c and the second memory unit 472d measure the second count values Cs2 and Cc2 as a change amount of the rotational position of the electric motor 44 and the second rotation count Rt2 as a rotation count of the electric motor 44.

In the motor drive control apparatus 45 according to the first embodiment, the controller 48 and the motor drive circuit 49 drive and control the electric motor 44 on the basis of the first and second motor rotation angles θm1 and θm2 output from the first and second rotation information detection function units 51 and 52 of the two channels.

When it is determined that the IG switch 62 is changed to the OFF state, the power control unit 50 intermittently supplies the power from the battery 61 to the first and second rotation information detection function units 51 and 52 at the first interval X1 set in advance during the OFF state while the motor rotation number of the electric motor 44 is lower than the preset rotation number ωt set in advance. In addition, the power control unit 50 intermittently supplies the power from the battery 61 to the first and second rotation information detection function units 51 and 52 at the second interval X2 shorter than the first interval X1 set in advance during the OFF state of the IG switch 62 while the motor rotation number of the electric motor 44 is equal to or higher than the preset rotation number ωt set in advance.

If it is diagnosed that one of the first and second rotation information detection function units 51 and 52 is abnormal from the motor rotational position signal, the controller 48 and the motor drive circuit 49 drive and control the electric motor 44 on the basis of the motor rotation angle output from the other normal rotation information detection function unit.

In this configuration, during the OFF state of the IG switch 62, it is possible to continuously perform the operation by changing the power supply state for the first and second rotation information detection function units 51 and 52 to the first intermittent supply state. In addition, it is possible to continuously perform the operation by changing the power supply state from the first intermittent supply state to the second intermittent supply state when the motor rotation number becomes equal to or higher than the preset rotation number ωt.

As a result, when the motor rotation number is relatively slow (when the change of the rotational position is relatively small), it is possible to supply power at the first interval X1 which is a relatively longer supply interval by focusing on the low power consumption. In addition, when the motor rotation number is relatively fast (when the change of the rotational position is relatively large), it is possible to supply power at the second interval X2 which is a relatively short supply interval by focusing on followability to the change. As a result, compared to the prior art, it is possible to reduce the power consumption of the battery 61 while maintaining detection accuracy of the motor rotation information.

(2) In the motor drive control apparatus 45 according to the first embodiment, the first diagnosis unit 471*b* diagnoses whether or not the rotational position information detected by the first rotational position information detector 46*b* is abnormal. The second diagnosis unit 472*b* diagnoses whether or not the rotational position information detected by the second rotational position information detector 46*c* is abnormal. When it is diagnosed that the first diagnosis unit 471*b* or the second diagnosis unit 472*b* of the first and second rotation information detection function units 51 and 52 is abnormal, the controller 48 and the motor drive circuit 49 drive and control the electric motor 44 on the basis of the motor rotation angle, the change amount of the rotational position, and the rotation count output from the rotation information detection function unit having a normal state.

In this configuration, each of the first and second rotation information detection function units 51 and 52 has a diagnosis unit capable of diagnosing whether or not an abnormality occurs in the rotational position information. Therefore, it is possible to specify a rotation information detection function unit where an abnormality occurs. As a result, in a case where it is diagnosed that one of the rotation information detection function units is abnormal, it is possible to continuously drive and control the electric motor 44 using the other normal rotation information detection function unit. In addition, since each channel can detect two types of rotational position information (sin θ, cos θ) having a phase difference of 90° using a pair of magnetic detection elements, it is possible to more accurately specify an abnormal channel from the two types of rotational position information.

(3) The electric power steering apparatus 3 and the vehicle 1 according to the first embodiment are provided with the motor drive control apparatus 45.

As a result, it is possible to perform the steering assistance control with high reliability.

Second Embodiment

Next, a second embodiment of the present invention will be described with reference to FIGS. 8 and 9.
<Configuration>
The second embodiment is different from the first embodiment in that the power from the battery 61 is intermittently supplied only to elements necessary to measure a change amount of the motor rotation position out of the components of the first and second rotation information detection function units 51 and 52 during the OFF state of the IG switch 62.

In the following description, like reference numerals denote like elements as in the first embodiment, and they will not be described repeatedly. In addition, only different parts will be described in details.

Figure 8:
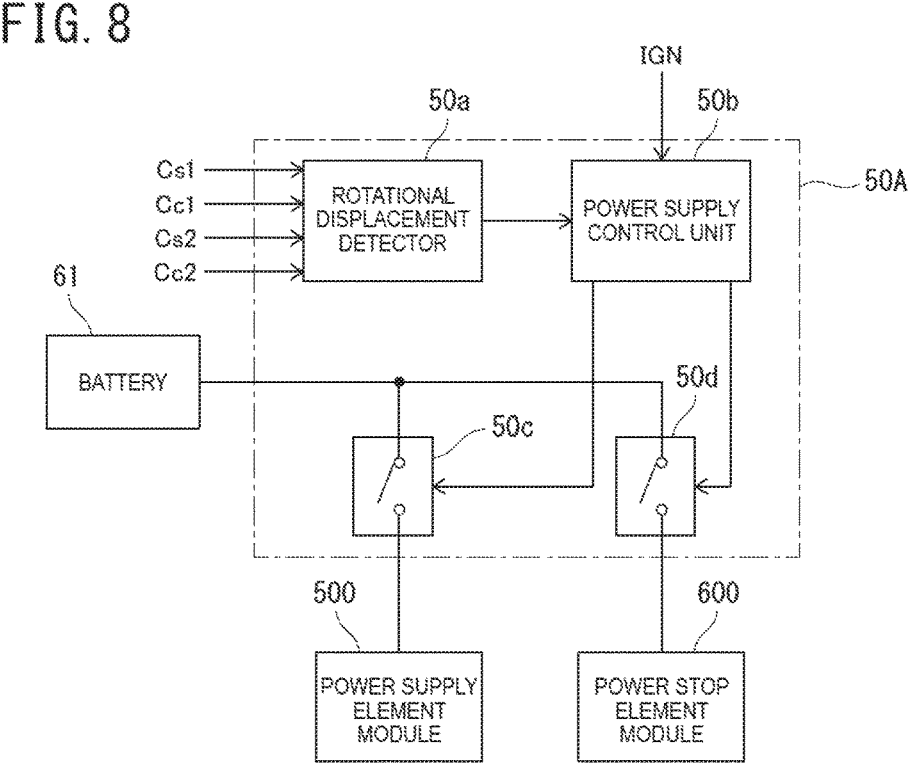
FIG. 8 is a block diagram illustrating a specific configuration of a power control unit according to a second embodiment.

As illustrated in FIG. 8, a power control unit 50A according to the second embodiment further has a second changeover switch 50*d* in addition to the elements of the power control unit 50 of the first embodiment.

The first changeover switch 50*c* according to the second embodiment is configured to change over between conduction and non-conduction states of the power supplied to the power supply element module 500.

The newly added second changeover switch 50*d* is configured to change over between conduction and non-conduction states of the power supplied to the power stop element module 600.

The power supply element module 500 is an element module necessary to measure the change amount of the motor rotation position and also an element module to be operated during the OFF state of the IG switch 62. That is, the power supply element module 500 is an element module for intermittently supplying the power from the battery 61 during the OFF state of the IG switch 62.

Figure 9:
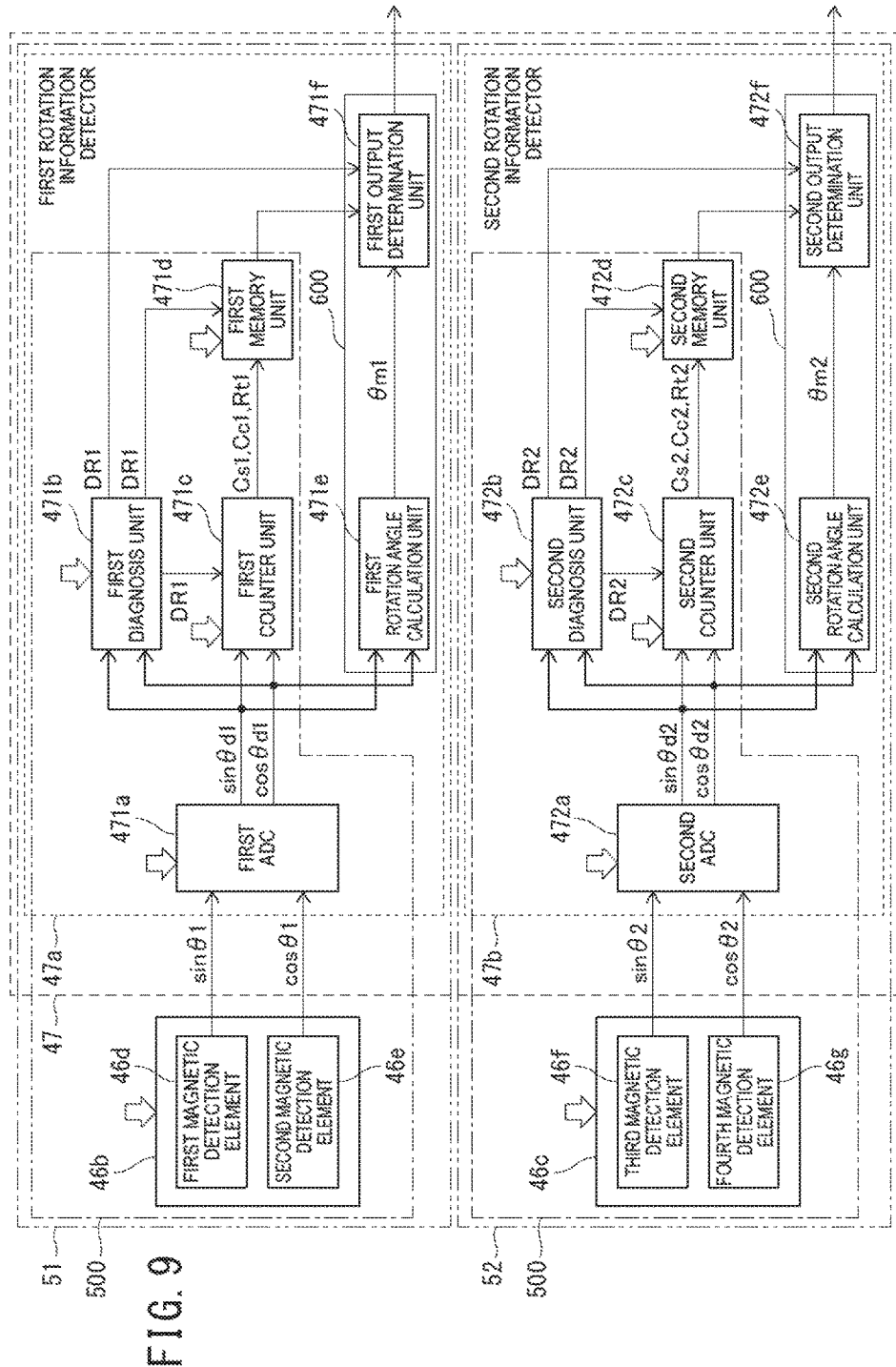
FIG. 9 is a block diagram illustrating an exemplary power supply target when the IG switch of the power control unit according to the second embodiment is in an OFF state.

As illustrated in FIG. 9, the power supply element module 500 includes first and second rotational position information detectors 46*b* and 46*c*, first and second ADCs 471*a* and 472*a*, first and second diagnosis units 471*b* and 472*b*, first and second counter units 471*c* and 472*c*, and first and second memory units 471*d* and 472*d*.

The power stop element module 600 is an element module not necessary to measure the change amount of the motor rotation position and also an element module of which operation is to stop during the OFF state of the IG switch 62. That is, the power stop element module 600 is an element module for perfectly stopping (cutting off) the power supplied from the battery 61 during the OFF state of the IG switch 62.

As illustrated in FIG. 9, the power stop element module 600 includes first and second rotation angle calculation units 471*e* and 472*e* and first and second output determination units 471*f* and 472*f*.

When it is determined that the IG switch 62 is changed from the ON state to the OFF state, the power supply control unit 50*b* according to the second embodiment outputs a changeover control signal alternatingly repeating between the ON and OFF states to the first changeover switch 50*c* such that the first changeover switch 50*c* is in the ON state for a supply time Tc at every first interval X1. In addition, the power supply control unit 50*b* outputs a changeover control signal for fixing the second changeover switch 50*d* to the OFF state to the second changeover switch 50*d*. That is, the power supply control unit 50*d* changes the power supply state for the power supplied from the battery 61 to the first and second rotation information detection function units 51 and 52 from the normal supply state to the first intermittent supply state.

Meanwhile, in a case where it is determined that the motor rotation number is equal to or higher than the preset rotation number ωt during the first intermittent supply state, the power supply control unit 50*b* according to the second embodiment outputs a changeover control signal alternatingly repeating between ON and OFF states to the first changeover switch 50*c* such that the first changeover switch 50*c* is in the ON state for a supply time Tc at every second interval X2. In addition, the power supply control unit 50b outputs a changeover control signal for fixing the second changeover switch 50d to the OFF state to the second changeover switch 50d.

That is, as illustrated in FIG. 9, the power control unit 50A according to the second embodiment is configured to intermittently supply the power from the battery 61 to the elements indicated by the downward arrow frames and perfectly stop the power supplied to the elements not indicated by the arrow frame during the OFF state of the IG switch 62.

<Operation>

It is now assumed that the IG switch 62 of the vehicle 1 is changed from the ON state to the OFF state.

When it is determined that the IG switch 62 is in the OFF state, the power control unit 50A alternatingly and repeatedly switches on and off the first changeover switch 50c such that it is in the ON state only for a supply time Tc at every first interval X1. In addition, the second changeover switch 50d is fixed to the OFF state.

That is, the power supply state for the power supplied from the battery 61 to the power supply element module 500 is changed from the current normal supply state to the first intermittent supply state. In addition, the power supply state for the power supplied to the power stop element module 600 is changed from the normal supply state to the perfect stop state.

As a result, during the first intermittent supply state, the first and second motor rotational position signals having an analog format are continuously input to the first and second ADCs 471a and 472a and are converted into first and second digital rotation position signals having a digital format. In addition, the first and second diagnosis units 471b and 472b diagnose the first and second digital rotation position signals.

Here, it is assumed that the first and second digital rotation position signals are normal, and the first and second diagnosis result flags DR1 and DR2 are set to "0"

As a result, during the first intermittent supply state, a process of counting the first and second counter units 471c and 472c and a rotation count calculation process are continuously performed for a rotational displacement lower than the preset rotation number ωt. In addition, a process of storing rotation information of the first and second memory units 471d and 472d is continuously performed.

Meanwhile, the first and second rotation angle calculation units 471e and 472e and the first and second output determination units 471f and 472f are not operated since no power is supplied.

Subsequently, it is assumed that a driver performs steering relatively fast, and it is determined that the motor rotation number becomes equal to or higher than the preset rotation number ωt. As a result, the power control unit 50 alternatingly and repeatedly switches on and off the first changeover switch 50c such that it is in the ON state only for a supply time Tc at every second interval X2. In addition, the second changeover switch 50d is fixed to the OFF state.

That is, the power supply state for the power supplied from the battery 61 to the power supply element module 500 is changed from the current first intermittent supply state to the second intermittent supply state. In addition, the power supply state for the power supplied to the power stop element module 600 is continuously maintained in the perfect stop state.

As a result, during the second intermittent supply state, a count process of the first and second counter units 471c and 472c and a rotation count calculation process are continuously performed for the rotational displacement equal to or larger than the preset rotation number ωt. In addition, a process of storing the rotation information of the first and second memory units 471d and 472d is continuously performed.

Meanwhile, the first and second rotation angle calculation units 471e and 472e and the first and second output determination units 471f and 472f are not operated because no power is supplied.

Advantageous Effects of Second Embodiment

The second embodiment has the following advantageous effects in addition to those of the first embodiment.

(1) In the motor drive control apparatus 45 according to the second embodiment, the power control unit 50 intermittently supplies the power from the battery 61 to the power supply element module 500 and cuts off the power supplied to the power stop element module 600 during the OFF state of the IG switch 62.

In this configuration, during the OFF state of the IG switch 62, it is possible to intermittently supply power and supply power only to elements necessary to operate during the OFF state (elements necessary to measure the change amount of the motor rotation position). Therefore, it is possible to more save the power consumption during the OFF state.

Third Embodiment

Next, a third embodiment of the present invention will be described with reference to FIG. 10.

<Configuration>

The third embodiment is different from the first and second embodiments in that it is determined whether or not the motor rotation number starts to decrease during the second intermittent supply state. In addition, when it is determined that the motor rotation number starts to decrease, the power supply interval is changed until the motor rotation number decreases under the preset rotation number ωt from that timing.

In the following description, like reference numerals denote like elements as in the first and second embodiments, and they will not be described repeatedly. In addition, only different parts will be described in details.

In the power supply control unit 50b according to the third embodiment, it is determined whether or not the motor rotation number starts to decrease on the basis of the rotational displacement input from the rotational displacement detector 50a during the second intermittent supply state. In addition, when it is determined that the motor rotation number starts to decrease, the power from the battery 61 is intermittently supplied to the first and second rotation information detection function units 51 and 52 at a third interval X3 set in advance during the decreasing period until the motor rotation number becomes lower than the preset rotation number ωt from that timing. Here, the third interval X3 is shorter than the first interval X1 and longer than the second interval X2.

Hereinafter, the power supply state for intermittently supplying the power at the third interval X3 may be referred to as a "third intermittent supply state" in some cases.

<Operation>

An exemplary operation in a case where the configuration according to the third embodiment is applied to the configuration of the first embodiment will now be described with reference to FIG. 10.

It is now assumed that a driver performs steering relatively fast during the first intermittent supply state, so that the motor rotation number becomes equal to or higher than the preset rotation number ωt. As a result, as illustrated in FIG. 10, the power control unit 50 alternatingly and repeatedly switches on and off the first changeover switch 50c such that it is in the ON state for a supply time Tc (1 [ms] in the example of FIG. 10) at every second interval X2 (having the OFF state for 1 [ms] in the example of FIG. 10). That is, the power supply state of the power supplied from the battery 61 to the first and second rotation information detection function units 51 and 52 is changed from the current first intermittent supply state to the second intermittent supply state.

Figure 10:
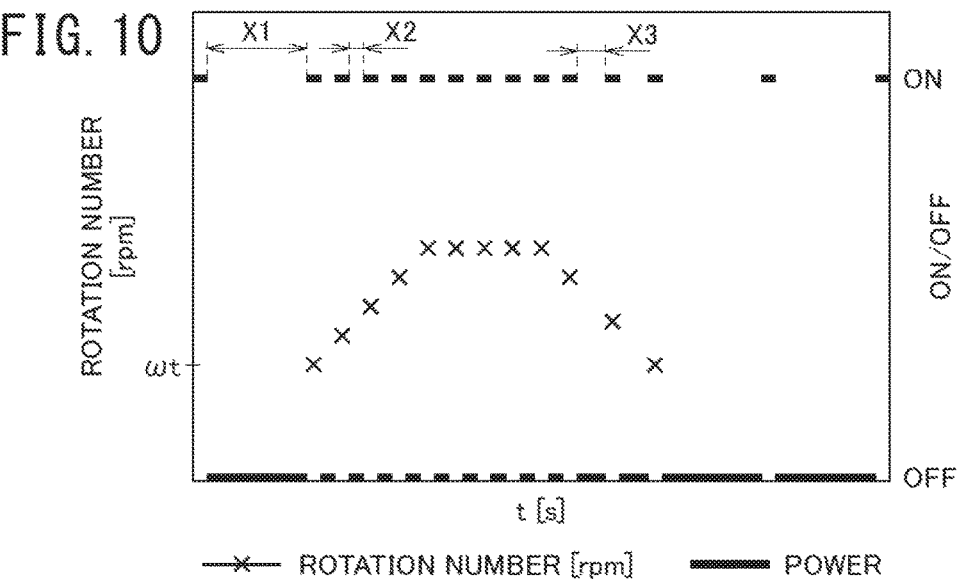
FIG. 10 is a waveform diagram illustrating an exemplary power supply control when the IG switch according to a third embodiment is in an OFF state.

Note that, in FIG. 10, the cross marks indicate a motor rotation number [rpm] corresponding to the power supply timing, and the thick straight lines and the thick dotted lines indicate ON and OFF (conduction and non-conduction) states of the first changeover switch 50c.

In the example of FIG. 10, the motor rotation number increases to approximately 100 [rpm] and starts to decrease after it is maintained constantly for a certain period. When the start of the decrease of the motor rotation number is detected, the power control unit 50 alternatingly and repeatedly switches on and off the first changeover switch 50c as illustrated in FIG. 10 such that it is in the ON state for a supply time Tc (1 [ms]) at every third interval X3 (having the OFF state for 1<X3<99 [ms] in the example of FIG. 10). That is, the power supply state of the power supplied from the battery 61 to the first and second rotation information detection function units 51 and 52 is changed from the current second intermittent supply state to the third intermittent supply state.

As a result, as the motor rotation number starts to decrease during the second intermittent supply state, the first and second counter units 471c and 472c can count the value corresponding to the changes of the first and second digital rotation position signals in the power supply state based on the third interval X3 shorter than the first interval X1 and longer than the second interval X2. In addition, the first and second counter units 471c and 472c can calculate the rotation count on the basis of these count values. Furthermore, the first and second memory units 471d and 472d can store the first rotational displacement information and the second rotational displacement information.

That is, as the motor rotation number decreases, the change amount of the rotational position also decreases, so that there is a margin in followability to the change of the rotational position in the second intermittent supply state. For this reason, it is possible to reduce the power consumption while maintaining the followability necessary to measure the change amount by lengthening the supply interval on the basis of the margin during the decrease of the rotation number.

Advantageous Effects of Third Embodiment

According to the third embodiment, it is possible to obtain the following advantageous effects in addition to those of the first embodiment.

(1) In the motor drive control apparatus 45 according to the third embodiment, when it is determined that the motor rotation number starts to decrease during the second intermittent supply state, the power control unit 50 supplies the power from the battery 61 to the first and second rotation information detection function units 51 and 52 at the third interval X3 set in advance to be shorter than the first interval X1 and longer than the second interval X2 until the motor rotation number becomes lower than the preset rotation number ωt during the decreasing period.

In this configuration, it is possible to change the power supply interval from the second interval X2 to the third interval X3 when the motor rotation number decreases, and the change of the rotational position is reduced during the second intermittent supply state. As a result, it is possible to more reduce the power consumption while maintaining the measurement accuracy of the change amount of the rotational position within an allowable range.

Fourth Embodiment

Next, the fourth embodiment according to the present invention will be described with reference to FIG. 11.
<Configuration>

The fourth embodiment is different from the first and second embodiments in that two types of preset rotation numbers corresponding to the change direction are set as threshold values used to determine whether or not the power supply state is changed to the first intermittent supply state and the second intermittent supply state.

In the following description, like reference numerals denote like elements as in the first and second embodiments, and they will not be described repeatedly. In addition, only different parts will be described in details.

In the power supply control unit 50b according to the fourth embodiment, it is determined whether or not the motor rotation number is equal to or higher than the first preset rotation number ωt1 set in advance on the basis of the rotational displacement input from the rotational displacement detector 50a during the first intermittent supply state. When it is determined that the motor rotation number is equal to or higher than the first preset rotation number ωt1 in this determination, the power supply state of the power supplied from the battery 61 to the first and second rotation information detection function units 51 and 52 is changed from the current first intermittent supply state to the second intermittent supply state.

In the power supply control unit 50b according to the fourth embodiment, it is determined whether or not the motor rotation number is equal to or lower than a second preset rotation number ωt2 different from the first preset rotation number ωt1 set in advance on the basis of the rotational displacement input from the rotational displacement detector 50a during the second intermittent supply state. In addition, when it is determined that the motor rotation number is equal to or lower than the second preset rotation number ωt2, the power supply state of the power supplied from the battery 61 to the first and second rotation information detection function units 51 and 52 is changed from the current second intermittent supply state to the first intermittent supply state.

According to the fourth embodiment, the first preset rotation number ωt1 is set to be higher than the second preset rotation number ωt2.
<Operation>

Next, an exemplary operation in a case where a configuration according to the fourth embodiment is applied to the configuration of the first embodiment will be described with reference to FIG. 11.

It is now assumed that the IG switch 62 of the vehicle 1 is switched from the ON state to the OFF.

Figure 11:
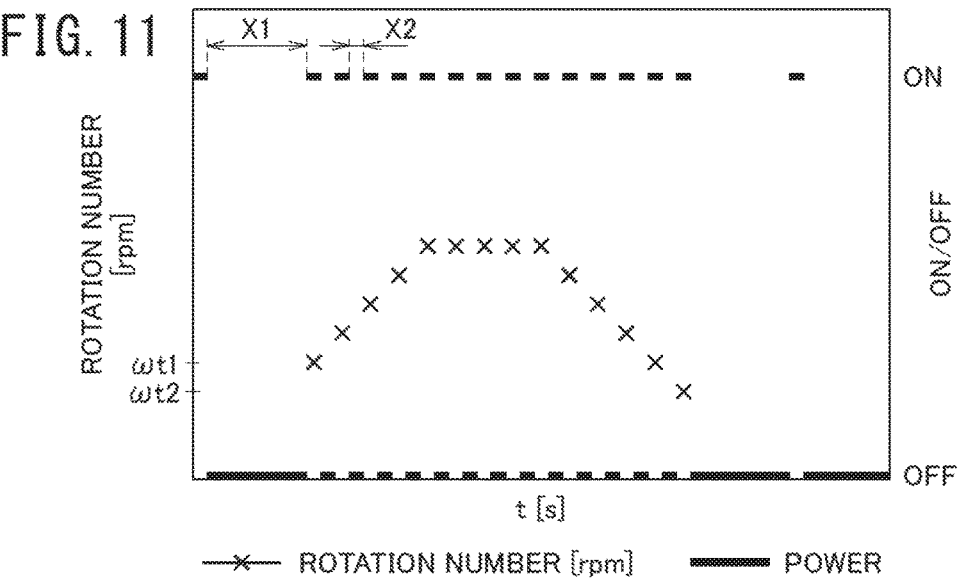
FIG. 11 is a waveform diagram illustrating an exemplary power supply control when the IG switch according to a fourth embodiment is in an OFF state.

As a result, as illustrated in FIG. 11, the power control unit 50 alternatingly and repeatedly switches on and off the first changeover switch 50c such that it is in the ON state for a supply time Tc (1 [ms] in the example of FIG. 11) at every first interval X1 (having the OFF state for 99 [ms] in the example of FIG. 11). That is, the power supply state of the power supplied to the first and second rotation information detection function units 51 and 52 is changed from the current normal supply state to the first intermittent supply state.

Note that, in FIG. 11, the cross marks indicate the motor rotation number [rpm] corresponding to the power supply timing, and the thick straight lines and the thick dotted lines indicate ON and OFF (conduction and non-conduction) states of the first changeover switch 50c.

Then, the power control unit 50 determines whether or not the motor rotation number is equal to or higher than the first preset rotation number $\omega t1$ (50 [rpm] in the example of FIG. 11) on the basis of the rotational displacement input from the rotational displacement detector 50a during the first intermittent supply state.

Here, it is assumed that a driver of the vehicle 1 performs steering relatively fast, so that the motor rotation number becomes equal to or higher than the first preset rotation number $\omega t1$. As a result, as illustrated in FIG. 11, the power control unit 50 alternatingly and repeatedly switches on and off the first changeover switch 50c such that it is in the ON state for a supply time Tc (1 [ms]) at every second interval X2 (having the OFF state for 1 [ms] in the example of FIG. 11). That is, the power supply state of the power supplied from the battery 61 to the first and second rotation information detection function unit 51 and 52 is changed from the current first intermittent supply state to the second intermittent supply state.

Subsequently, the power control unit 50 determines whether or not the motor rotation number is equal to or lower than the second preset rotation number $\omega t2$ (30 [rpm] in the example of FIG. 11) on the basis of the rotational displacement input from the rotational displacement detector 50a during the second intermittent supply state.

Here, it is assumed that the steering speed decreases, and it is determined that the motor rotation number becomes equal to or lower than the second preset rotation number $\omega t2$ As a result, as illustrated in FIG. 11, the power control unit 50 alternatingly and repeatedly switches on and off the first changeover switch 50c such that it is in the ON state for a supply time Tc (1 [ms]) at every first interval X1 (99 [ms]). That is, the power supply state of the power supplied from the battery 61 to the first and second rotation information detection function units 51 and 52 is changed from the current second intermittent supply state to the first intermittent supply state.

Advantageous Effects of Fourth Embodiment

According to the fourth embodiment, it is possible to obtain the following advantageous effects in addition to those of the first embodiment.

(1) In the motor drive control apparatus 45 according to the fourth embodiment, the first preset rotation number $\omega t1$ used to determine when the power supply state is changed from the first intermittent supply state to the second intermittent supply state and the second preset rotation number $\omega t2$ used to determine when the power supply state is changed from the second intermittent supply state to the first intermittent supply state and different from the first preset rotation number $\omega t1$ are set in advance ($\omega t1 > \omega t2$ in the fourth embodiment). In addition, when it is determined that the motor rotation number is equal to or higher than the first preset rotation number $\omega t1$, the power control unit 50 changes the power supply state from the first intermittent supply state to the second intermittent supply state. When it is determined that the motor rotation number becomes equal to or lower than the second preset rotation number $\omega t2$ after it becomes equal to or higher than the first preset rotation number $\omega t1$ and then starts to decrease, the power control unit 50 changes the power supply state from the second intermittent supply state to the first intermittent supply state.

In this configuration, it is possible to differently set the condition for changing the power supply state from the first intermittent supply state to the second intermittent supply state and the condition for changing (returning) the power supply state from the second intermittent supply state to the first intermittent supply state. Specifically, it is possible to reduce the power consumption by strictly setting the condition for changing the power supply state from the first intermittent supply state to the second intermittent supply state. Alternatively, it is possible to improve followability during the decreasing operation by loosely setting the condition for changing the power supply state from the second intermittent supply state to the first intermittent supply state.

In particular, since the first preset rotation number $\omega t1$ is set to be higher than the second preset rotation number $\omega t2$, it is possible to prevent occurrence of haunting, compared to a case where they are set to be equal.

For example, it may be possible to set the first preset rotation number $\omega t1$ to be lower than the second preset rotation number $\omega t2$ by performing the control such that the second intermittent supply state continues while the rotation number increases and is maintained constantly. In this case, it is possible to improve followability of the rotation number during the increasing period or save the power consumption during the decreasing period.

Fifth Embodiment

Next, the fifth embodiment according to the present invention will be described with reference to FIG. 12.
<Configuration>

The fifth embodiment is different from the first and second embodiments in that the power supply state is changed from the first intermittent supply state to the normal supply state when the motor rotation number becomes equal to or higher than the preset rotation number $\omega t$ during the OFF state of the IG switch 62 and the first intermittent supply state.

In the following description, like reference numerals denote like elements as in the first and second embodiments, and they will not be described repeatedly. In addition, only different parts will be described in details.

In the power supply control unit 50b according to the fifth embodiment, when it is determined that the IG switch 62 is in the OFF state, the power supply state of the power supplied from the battery 61 to the first and second rotation information detection function units 51 and 52 is changed from the current normal supply state to the first intermittent supply state.

Meanwhile, in the power supply control unit 50b according to the fifth embodiment, when it is determined that the motor rotation number becomes equal to or higher than the preset rotation number $\omega t$ during the first intermittent supply state, the power supply state of the power supplied from the battery 61 to the first and second rotation information detection function units 51 and 52 is changed from the current first intermittent supply state to the normal supply state.

Then, if it is determined that the motor rotation number becomes lower than the preset rotation number $\omega t$ during the OFF state of the IG switch 62 and the normal supply state, the power supply state of the power supplied from the battery 61 to the first and second rotation information detection function unit 51 and 52 is changed from the current normal supply state to the first intermittent supply state.

<Operation>

An exemplary operation in a case where a configuration according to the fifth embodiment is applied to the configuration of the first embodiment will be described with reference to FIG. 12.

It is now assumed that the IG switch 62 of the vehicle 1 is changed from the ON state to the OFF state.

As a result, as illustrated in FIG. 12, the power control unit 50 alternatingly and repeatedly switches on and off the first changeover switch 50c such that it is in the ON state for a supply time Tc (1 [ms] in the example of FIG. 12) at every first interval X1 (having the OFF state for 99 [ms] in the example of FIG. 12). That is, the power supply state of the power supplied from the battery 61 to the first and second rotation information detection function units 51 and 52 is changed from the current normal supply state to the first intermittent supply state.

Note that, in FIG. 12, the thin line indicates the motor rotation number [rpm] in the normal supply state, and the thick straight line and the thick dotted line indicate the ON and OFF (conduction and non-conduction) states of the first changeover switch 50c.

Then, in the first intermittent supply state, it is assumed that a driver performs steering relatively fast, so that the motor rotation number becomes equal to or higher than the preset rotation number ωt. As a result, as illustrated in FIG. 12, the power control unit 50 fixes the first changeover switch 50c to the ON state such that the power is continuously supplied without an interval. That is, the power supply state of the power supplied from the battery 61 to the first and second rotation information detection function units 51 and 52 is changed from the current first intermittent supply state to the normal supply state.

As a result, in a case where the steering is performed at a rotation number equal to or higher than the preset rotation number ωt during the OFF state of the IG switch 62, the first and second counter units 471c and 472c can count the value corresponding to the change of the first and second digital rotation position signals under a full operation state in the normal supply state. In addition, it is possible to calculate the rotation count on the basis of these count values. Furthermore, the first and second memory units 471d and 472d can store the first rotational displacement information and the second rotational displacement information.

Advantageous Effects of Fifth Embodiment

According to the fifth embodiment, it is possible to obtain the following advantageous effects in addition to those of the first embodiment.

(1) The motor drive control apparatus 45 according to the fifth embodiment has a ring-shaped multipolar ring magnet 46a provided on the motor rotation shaft 44a of the electric motor 44 that applies a steering assistance force to the steering shaft 32 rotatably in synchronization with the motor rotation shaft 44a and provided with two or more different magnetic poles alternatingly arranged along the circumferential direction.

In addition, the motor drive control apparatus 45 according to the fifth embodiment has a two-channel rotation information detection function unit including the first rotation information detection function unit 51 and the second rotation information detection function unit 52.

In the first rotation information detection function unit 51, the first rotational position information detector 46b detects the magnetic flux of the multipolar ring magnet 46a that changes depending on a rotational position of the motor rotation shaft 44a as the rotational position information (first motor rotational position signal (sin θ1, cos θ1)) using the first and second magnetic detection elements 46d and 46e. The first rotation angle calculation unit 471e calculates the first motor rotation angle θm1 on the basis of the rotational position information detected by the first rotational position information detector 46b. Furthermore, the first counter unit 471c and the first memory unit 471d measure the first count values Cs1 and Cc1 as a change amount of the rotational position of the electric motor 44 and the first rotation count Rt1 as a rotation count of the electric motor 44.

In the second rotation information detection function unit 52, the second rotational position information detector 46c detects a magnetic flux of the multipolar ring magnet 46a that changes depending on the rotational position of the motor rotation shaft 44a as the rotational position information (second motor rotational position signal (sin θ2, cos θ2)) using the third and fourth magnetic detection elements 46f and 46g. The second rotation angle calculation unit 472e calculates the second motor rotation angle θm2 on the basis of the rotational position information detected by the second rotational position information detector 46c. The second counter unit 472c and the second memory unit 472d measure the second count values Cs2 and Cc2 as a change amount of the rotational position of the electric motor 44 and the second rotation count Rt2 as a rotation count of the electric motor 44.

In the motor drive control apparatus 45 according to the fifth embodiment, the controller 48 and the motor drive circuit 49 drive and control the electric motor 44 on the basis of the first and second motor rotation angles θm1 and θm2 output from the first and second rotation information detection function units 51 and 52 of the two channels.

When it is determined that the IG switch 62 is in the OFF state, the power control unit 50 performs the control such that the power from the battery 61 is intermittently supplied to the first and second rotation information detection function units 51 and 52 at the first interval X1 set in advance during the OFF state while the motor rotation number of the electric motor 44 is lower than the preset rotation number ωt set in advance. In addition, during the OFF state of the IG switch 62, the power from the battery 61 is continuously supplied to the first and second rotation information detection function units 51 and 52 without an interval while the motor rotation number of the electric motor 44 is equal to or higher than the preset rotation number ωt set in advance.

Furthermore, if the controller 48 and the motor drive circuit 49 diagnose that the motor rotational position signal is abnormal in one of the first and second rotation information detection function units 51 and 52, the electric motor 44 is driven and controlled on the basis of the motor rotation angle output from the other normal rotation information detection function unit.

In this configuration, it is possible to continuously operate the first and second rotation information detection function units 51 and 52 even during the OFF state of the IG switch 62 and save the power consumption during the OFF state. In addition, it is possible to fully operate the first and second rotation information detection function units 51 and by changing the power supply state from the first intermittent supply state to the normal supply state when the motor rotation number becomes equal to or higher than the preset rotation number ωt. As a result, it is possible to more reliably measure the change amount of the motor rotation position and the rotation count when the motor rotation number is equal to or higher than the preset rotation number ωt.

Sixth Embodiment

Next, a sixth embodiment of the present invention will be described with reference to FIG. 13.
<Configuration>
The sixth embodiment is different from the fifth embodiment in that it is determined whether or not the motor rotation number starts to decrease during the OFF state of the IG switch 62 and during the normal supply state. In addition, when it is determined that the motor rotation number starts to decrease, the power is intermittently supplied during the decreasing period until the motor rotation number decreases under the preset rotation number from that timing.

In the following description, like reference numerals denote like elements as in the fifth embodiment, and they will not be described repeatedly. In addition, only different parts will be described in details.

In the power supply control unit 50b according to the sixth embodiment, it is determined whether or not the motor rotation number starts to decrease on the basis of the rotational displacement input from the rotational displacement detector 50a after the motor rotation number becomes equal to or higher than the preset rotation number ωt during the OFF state of the IG switch 62, and the power supply state is changed from the first intermittent supply state to the normal supply state. In addition, when it is determined that the motor rotation number starts to decrease, the power from the battery 61 is intermittently supplied to the first and second rotation information detection function units 51 and 52 at the second interval X2 set in advance until the motor rotation number becomes lower than the preset rotation number ωt during the decreasing period. Note that the second interval X2 may be set to a different interval without a limitation.
<Operation>
Next, an exemplary operation in a case where the configuration according to the sixth embodiment is applied to the configuration of the first embodiment will be described with reference to FIG. 13.

It is now assumed that a driver performs steering relatively fast in the first intermittent supply state, and the motor rotation number becomes equal to or higher than the preset rotation number ωt.

As a result, as illustrated in FIG. 13, the power control unit 50 fixes the first changeover switch 50c to the ON state such that power is continuously supplied without an interval. That is, the power supply state of the power supplied from the battery 61 to the first and second rotation information detection function units 51 and 52 is changed from the current first intermittent supply state to the normal supply state.

Note that, in FIG. 13, the thin line and the cross marks indicate the motor rotation number [rpm] corresponding to the power supply timing, and the thick straight lines and the thick dotted lines indicate the ON and OFF (conduction and non-conduction) states of the first changeover switch 50c.

In the example of FIG. 13, the motor rotation number increases to approximately 100 [rpm], is maintained at that state for a certain period, and then starts to decrease. When this start of the decreasing motor rotation number is detected, the power control unit 50 alternatingly and repeatedly switches on and off the first changeover switch 50c such that it is in the ON state for a supply time Tc (1 [ms] in the example of FIG. 13) at every second interval X2 (having the OFF state for 1 [ms] in the example of FIG. 13) as illustrated in FIG. 13. That is, the power supply state of the power supplied from the battery 61 to the first and second rotation information detection function units 51 and 52 is changed from the current normal supply state to the second intermittent supply state.

As a result, when the motor rotation number starts to decrease in the normal supply state, the first and second counter units 471c and 472c can count the value corresponding to the change of the first and second digital rotation position signals while the power control unit 50 is operated in the second intermittent supply state. In addition, it is possible to calculate the rotation count on the basis of these count values. Furthermore, the first and second memory units 471d and 472d can store the first rotational displacement information and the second rotational displacement information.

That is, when the motor rotation number decreases, the change amount of the rotational position also decreases, so that there is a margin in the followability to the change of the rotational position in the normal supply state. For this reason, it is possible to reduce the power consumption while maintaining the followability necessary to measure the change amount by setting the intermittent supply state during the decreasing period of the rotation number on the basis of this margin.

Advantageous Effects of Sixth Embodiment

According to the sixth embodiment, it is possible to obtain the following advantageous effects in addition to those of the fifth embodiment.

(1) In the motor drive control apparatus 45 according to the sixth embodiment, when it is determined that the motor rotation number starts to decrease after the motor rotation number becomes equal to or higher than the preset rotation number ωt, and the power supply state is changed from the first intermittent supply state to the normal supply state, the power control unit 50 performs the control such that the power from the battery 61 is intermittently supplied to the first and second rotation information detection function units 51 and 52 at the second interval X2 until the motor rotation number becomes lower than the preset rotation number ωt during the decreasing period.

In this configuration, while the motor rotation number decreases, and the change of the rotational position decreases, it is possible to change the power supply state from the normal supply state to the intermittent supply state. As a result, it is possible to more reduce the power consumption while maintaining the measurement accuracy of the change amount of the rotational position.

Seventh Embodiment

Next, the seventh embodiment of the present invention will be described with reference to FIG. 14.
<Configuration>
The seventh embodiment is different from the fifth embodiment in that two types of preset rotation numbers corresponding to the change direction are set as threshold values used to determine whether or not the power supply state is changed to the first intermittent supply state and the normal supply state.

In the following description, like reference numerals denote like elements as in the fifth embodiment, and they will not be described repeatedly. In addition, only different parts will be described in details.

In the power supply control unit 50b according to the seventh embodiment, when it is determined that the IG switch 62 is changed from the ON state to the OFF state, the power supply state of the power supplied from the battery 61 to the first and second rotation information detection function units 51 and 52 is changed from the current normal supply state to the first intermittent supply state.

Meanwhile, the power supply control unit 50b according to the seventh embodiment determines whether or not the motor rotation number becomes equal to or higher than the first preset rotation number $\omega t1$ set in advance on the basis of the rotational displacement input from the rotational displacement detector 50a during the first intermittent supply state.

When it is determined that the motor rotation number becomes equal to or higher than the first preset rotation number $\omega t1$ in this determination, the power supply control unit 50b according to the seventh embodiment changes the power supply state of the power supplied from the battery 61 to the first and second rotation information detection function units 51 and 52 from the current first intermittent supply state to the normal supply state.

The power supply control unit 50b according to the seventh embodiment determines whether or not the motor rotation number becomes equal to or lower than the second preset rotation number $\omega t2$ set in advance and different from the first preset rotation number $\omega t1$ set in advance on the basis of the rotational displacement input from the rotational displacement detector 50a during the normal supply state. In addition, when it is determined that the motor rotation number becomes equal to or lower than the second preset rotation number $\omega t2$, the power supply state of the power supplied from the battery 61 to the first and second rotation information detection function units 51 and 52 is changed from the current normal supply state to the first intermittent supply state.

According to the seventh embodiment, the first preset rotation number $\omega t1$ is set to a value higher than the second preset rotation number $\omega t2$.

<Operation>

It is now assumed that the IG switch 62 of the vehicle 1 is changed from the ON state to the OFF state.

Figure 14:
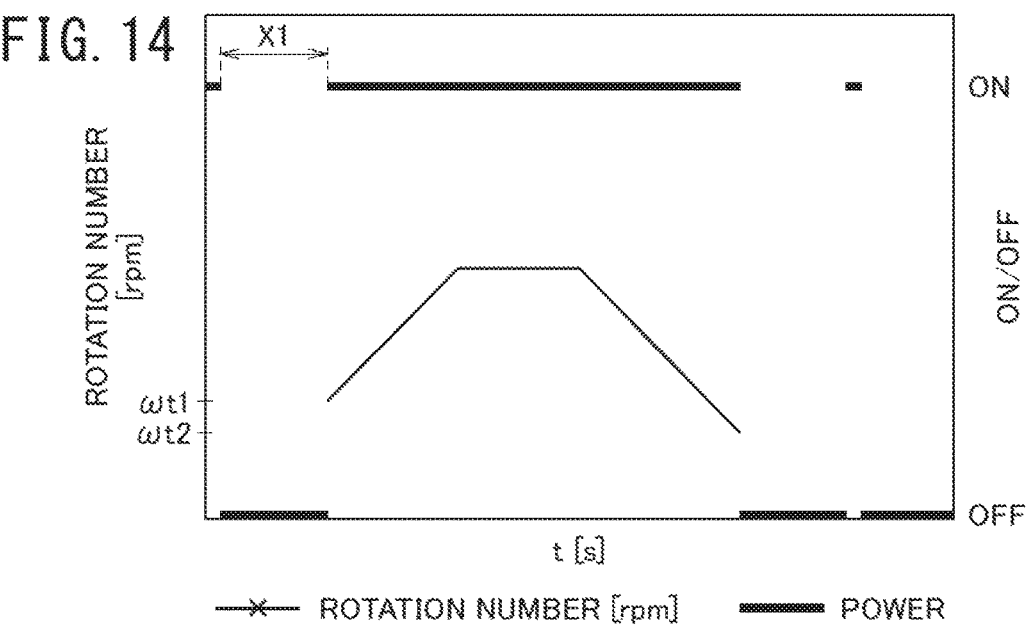
FIG. 14 is a waveform diagram illustrating an exemplary power supply control when the IG switch according to a seventh embodiment is in an OFF state.

As a result, as illustrated in FIG. 14, the power control unit 50 alternatingly and repeatedly switches on and off the first changeover switch 50c such that it is in the ON state for a supply time Tc (1 [ms] in the example of FIG. 14) at every first interval X1 (having the OFF state for 99 [ms] in the example of FIG. 14). That is, the power supply state of the power supplied from the battery 61 to the first and second rotation information detection function units 51 and 52 is changed from the current normal supply state to the first intermittent supply state.

Note that, in FIG. 14, the thin line indicates the motor rotation number corresponding to the power supply timing, and the thick straight lines and the thick dotted lines indicate the ON and OFF (conduction and non-conduction) states of the first changeover switch 50c.

Then, it is determined whether or not the motor rotation number becomes equal to or higher than the first preset rotation number $\omega t1$ (50 [rpm] in the example of FIG. 14) on the basis of the rotational displacement input from the rotational displacement detector 50a in the first intermittent supply state.

Here, it is assumed that a driver performs steering relatively fast, and it is determined that the motor rotation number becomes equal to or higher than the first preset rotation number $\omega t1$. As a result, as illustrated in FIG. 14, the power control unit 50 fixes the first changeover switch 50c to the ON state such that the power is continuously supplied without an interval. That is, the power supply state of the power supplied from the battery 61 to the first and second rotation information detection function units 51 and 52 is changed from the current first intermittent supply state to the normal supply state.

Subsequently, the power control unit 50 determines whether or not the motor rotation number becomes equal to or lower than the second preset rotation number $\omega t2$ (30 [rpm] in the example of FIG. 14) on the basis of the rotational displacement input from the rotational displacement detector 50a in the normal supply state.

Here, it is assumed that the steering speed is reduced, and it is determined that the motor rotation number becomes equal to or lower than the second preset rotation number $\omega t2$ As a result, as illustrated in FIG. 14, the power control unit 50 alternatingly and repeatedly switches on and off the first changeover switch 50c such that it is in the ON state for a supply time Tc (1 [ms]) at every first interval X1 (99 [ms]). That is, the power supply state of the power supplied from the battery 61 to the first and second rotation information detection function units 51 and 52 is changed from the current normal supply state to the first intermittent supply state.

Advantageous Effects of Seventh Embodiment

According to the seventh embodiment, it is possible to obtain the following advantageous effects in addition to those of the fifth embodiment.

(1) In the motor drive control apparatus 45 according to the seventh embodiment, the first preset rotation number $\omega t1$ used to determine when the power supply state is changed from the first intermittent supply state to the normal supply state and the second preset rotation number $\omega t2$ used to determine when the power supply state is changed from the normal supply state to the first intermittent supply state and different from the first preset rotation number $\omega t1$ are set in advance ($\omega t1 > \omega t2$ in the seventh embodiment). In addition, when it is determined that the motor rotation number becomes equal to or higher than the first preset rotation number $\omega t1$ during the OFF state of the IG switch 62, the power control unit 50 is changed from the first intermittent supply state to the normal supply state. When it is determined that the motor rotation number becomes equal to or lower than the second preset rotation number $\omega t2$ after the motor rotation number becomes equal to or higher than the first preset rotation number $\omega t1$ and then starts to decrease during the OFF state of the IG switch 62, the power control unit 50 changes the power supply state from the normal supply state to the first intermittent supply state.

In this configuration, it is possible to differently set the condition for changing the power supply state from the first intermittent supply state to the normal supply state and the condition for changing (returning) the power supply state from the normal supply state to the first intermittent supply state during the OFF state of the IG switch 62. Specifically, it is possible to reduce the power consumption by strictly setting the condition for changing the power supply state from the first intermittent supply state to the normal supply state or improve the followability during the decreasing period by loosely setting the condition for changing the power supply state from the normal supply state to the first intermittent supply state.

In particular, since the first preset rotation number $\omega t1$ is set to be higher than the second preset rotation number $\omega t2$, it is possible to prevent occurrence of haunting, compared to a case where they are set to the same value.

For example, it is possible to set the first preset rotation number $\omega t1$ to be lower than the second preset rotation number $\omega t2$ by performing the control such that the normal supply state is continuously set while the rotation number increases and is maintained constantly. In this case, it is possible to improve the followability during the increasing period of the rotation number or save the power consumption during the decreasing period.

Modifications to the Embodiments (1) Although the rotation information detection function unit has two channels in each of the aforementioned embodiments, it may have a single channel or three or more channels without limiting to this configuration.

(2) Although the motor rotation sensor 46 is a magnetic sensor in each of the aforementioned embodiments, it may be an optical sensor without limiting to this configuration.

(3) In each of the aforementioned embodiments, when an abnormality occurs, only various diagnosis result flags are output to the controller 48, and the controller 48 specifies the rotation information detection function unit or each element having the abnormality on the basis of various diagnosis result flags. However, the invention is not limited to this configuration. For example, even when an abnormality occurs, it may be possible to detect the abnormality in two chances by outputting the calculated motor rotation angle or the measured count value to the controller 48 and allowing the controller 48 to compare the motor rotation angle or the count value between each channel.

(4) In each of the aforementioned embodiments, the rotational position information input to the counter unit is "(sin θ, cos θ)." However, the invention is not limited to this configuration as long as it is the rotational position information. For example, rotational position information subjected to angular calculation may be employed.

(5) In each of the aforementioned embodiments, each of the first and second rotational position information detectors 46b and 46c has two magnetic detection elements capable of detecting magnetic signals having different phases. However, without limiting to this configuration, each of the first and second rotational position information detectors 46b and 46c may have three or more magnetic detection elements.

(6) Each of the aforementioned embodiments has been described, for example, by applying the present invention to a column assist type electric power steering apparatus. However, without limiting to this configuration, the present invention may be applied to, for example, a lock assist type or a pinion assist type electric power steering apparatus.

This application claims priority to Japanese Patent Application No. 2016-097216 (filed May 13, 2016), which is hereby incorporated by reference in its entirety.

While the invention has been described with reference to a limited number of embodiments herein, the scope of right is not limited thereto, and modifications of each embodiment based on this disclosure will be obvious to those skilled in the art.

REFERENCE SIGNS LIST 1 vehicle,
3 electric power steering apparatus,
44 electric motor,
45 motor drive control apparatus,
46 motor rotation sensor,
46a multipolar ring magnet,
46b first rotational position information detector,
46c second rotational position information detector,
47 rotation detection device,
47a first rotation information detector,
47b second rotation information detector,
48 controller,
49 motor drive circuit,
50 power control unit,
50a rotational displacement detector,
50b power supply control unit,
50c and 50d first to second changeover switches,
51 first rotation information detection function unit,
52 second rotation information detection function unit,
61 battery,
62 IG switch,
471a, 472a first and second ADCs,
471b, 472b first and second diagnosis units,
471c, 472c first and second counter units,
471d, 472d first and second memory units,
471e, 472e first and second rotation angle calculation units,
471f, 472f first and second output determination units,
500 power supply element module,
600 power stop element module

The invention claimed is:

1. A motor drive control apparatus comprising:
a ring-shaped or disk-shaped magnet provided rotatably in synchronization with a motor rotation shaft of an electric motor configured to apply a steering assistance force to a steering shaft and including two or more different magnetic poles arranged alternatingly along a circumferential direction;
a rotation information detection function unit including a rotational position information detector configured to detect a magnetic flux of the magnet as rotational position information and a rotation information detector configured to detect rotation information relating to a rotational displacement of the electric motor on the basis of the rotational position information detected by the rotational position information detector;
a motor drive control unit configured to drive and control the electric motor on the basis of the rotation information output from the rotation information detection function unit; and
a power control unit configured to, when it is determined that an ignition switch is in an OFF state, intermittently supply power from a battery to the rotation information detection function unit at a first interval set in advance during the OFF state of the ignition switch while a motor rotation number of the electric motor is lower than a preset rotation number set in advance and intermittently supply power from the battery at a second interval shorter than the first interval set in advance while the motor rotation number is equal to or higher than the preset rotation number set in advance.

2. The motor drive control apparatus according to claim 1, wherein, when it is determined that the motor rotation number starts to decrease while the power from the battery is intermittently supplied to the rotation information detection function unit at the second interval, the power control unit intermittently supplies the power from the battery to the rotation information detection function unit at a third interval shorter than the first interval set in advance and longer than the second interval until the motor rotation number becomes lower than the preset rotation number during a decreasing period.

3. The motor drive control apparatus according to claim 1, wherein, as the preset rotation number, a first preset rotation number used to determine when the power supply state is changed from a first intermittent supply state in which the power is intermittently supplied at the first interval to a second intermittent supply state in which the power is intermittently supplied at the second interval and a second preset rotation number different from the first preset rotation number and used to determine when the power supply state is changed from a third intermittent supply state in which the power is intermittently supplied at an interval different from the first interval to the first intermittent supply state are set in advance, the power control unit changes the power supply state from the first intermittent supply state to the second intermittent supply state when it is determined that the motor rotation number becomes equal to or higher than the first preset rotation number during the first intermittent supply state, and the power control unit changes the power supply state from the third intermittent supply state to the first intermittent supply state when it is determined that the motor rotation number becomes equal to or higher than the first preset rotation number, starts to decrease, and then becomes equal to or lower than the second preset rotation number.

4. A motor drive control apparatus comprising:

a ring-shaped or disk-shaped magnet provided rotatably in synchronization with a motor rotation shaft of an electric motor configured to apply a steering assistance force to a steering shaft and provided with two or more different magnetic poles arranged alternatingly along a circumferential direction;

a rotation information detection function unit including a rotational position information detector that configured to detect a magnetic flux of the magnet as rotational position information and a rotation information detector configured to detect rotation information relating to a rotational displacement of the electric motor on the basis of the rotational position information detected by the rotational position information detector;

a motor drive control unit configured to drive and control the electric motor on the basis of the rotation information output from the rotation information detection function unit; and a power control unit that, when it is determined that an ignition switch is in an OFF state, intermittently supplies power from a battery to the rotation information detection function unit at a first interval set in advance during the OFF state of the ignition switch, and, when it is determined that a motor rotation number of the electric motor becomes equal to or higher than a preset rotation number set in advance, continuously supply the power from the battery while the motor rotation number of the electric motor is equal to or higher than the preset rotation number.

5. The motor drive control apparatus according to claim 4, wherein, when it is determined that the motor rotation number starts to decrease after the motor rotation number becomes equal to or higher than the preset rotation number, and the power supply state is changed from the intermittent supply state at the first interval to the continuous supply state, the power control unit intermittently supplies the power from the battery to the rotation information detection function unit at a second interval shorter than the first interval set in advance until the motor rotation number becomes lower than the preset rotation number during a decreasing period.

6. The motor drive control apparatus according to claim 4, wherein, as the preset rotation number, a first preset rotation number used to determine when the power supply state is changed from a first supply state in which the power is intermittently supplied at the first interval to a normal supply state in which the power is continuously supplied and a second preset rotation number different from the first preset rotation number and used to determine when the power supply state is changed from a second supply state different from the first supply state to the first supply state are set in advance, the power control unit changes the power supply state from the first supply state to the normal supply state when it is determined that the motor rotation number becomes equal to or higher than the first preset rotation number, and the power control unit changes the power supply state from the second supply state to the first supply state when it is determined that the motor rotation number becomes equal to or lower than the second preset rotation number after the motor rotation number becomes equal to or higher than the first preset rotation number and starts to decrease.

7. The motor drive control apparatus according to claim 1, wherein the rotation information detection function unit has two or more channels, the rotation information detection function unit has a diagnosis unit configured to diagnose whether or not an abnormality occurs in the rotational position information detected by the rotational position information detector, the rotational position information detector has a plurality of sensor elements configured to detect magnetic signals having mutually different phases as the rotational position information, and when the diagnosis unit diagnoses that a part of the rotation information detection function units of the two or more channels is abnormal, the motor drive control unit drives and controls the electric motor on the basis of the rotation information output from the remaining normal rotation information detection function units.

8. The motor drive control apparatus according to claim 1, wherein the rotation information detector has:

a rotation angle detector configured to detect a motor rotation angle of the electric motor on the basis of the rotational position information; and a rotation information measurement unit that measures a change amount of the rotational position of the electric motor and a rotation count on the basis of the rotational position information.

9. The motor drive control apparatus according to claim 8, wherein, if it is determined that the ignition switch is in the OFF state, the power control unit supplies the power from the battery only to the rotational position information detector and the rotation information measurement unit out of elements of the rotation information detection function unit during the OFF state of the ignition switch.

10. An electric power steering apparatus comprising the motor drive control apparatus according to claim 1.

11. A vehicle comprising the electric power steering apparatus according to claim 10.

12. The motor drive control apparatus according to claim 2, wherein, as the preset rotation number, a first preset rotation number used to determine when the power supply state is changed from a first intermittent supply state in which the power is intermittently supplied at the first interval to a second intermittent supply state in which the power is intermittently supplied at the second interval and a second preset rotation number different from the first preset rotation number and used to determine when the power supply state is changed from a third intermittent supply state in which the power is intermittently supplied at an interval different from the first interval to the first intermittent supply state are set in advance,
- the power control unit changes the power supply state from the first intermittent supply state to the second intermittent supply state when it is determined that the motor rotation number becomes equal to or higher than the first preset rotation number during the first intermittent supply state, and
- the power control unit changes the power supply state from the third intermittent supply state to the first intermittent supply state when it is determined that the motor rotation number becomes equal to or higher than the first preset rotation number, starts to decrease, and then becomes equal to or lower than the second preset rotation number.

13. The motor drive control apparatus according to claim 5, wherein, as the preset rotation number, a first preset rotation number used to determine when the power supply state is changed from a first supply state in which the power is intermittently supplied at the first interval to a normal supply state in which the power is continuously supplied and a second preset rotation number different from the first preset rotation number and used to determine when the power supply state is changed from a second supply state different from the first supply state to the first supply state are set in advance,
- the power control unit changes the power supply state from the first supply state to the normal supply state when it is determined that the motor rotation number becomes equal to or higher than the first preset rotation number, and
- the power control unit changes the power supply state from the second supply state to the first supply state when it is determined that the motor rotation number becomes equal to or lower than the second preset rotation number after the motor rotation number becomes equal to or higher than the first preset rotation number and starts to decrease.

14. The motor drive control apparatus according to claim 2, wherein the rotation information detection function unit has two or more channels,
- the rotation information detection function unit has a diagnosis unit configured to diagnose whether or not an abnormality occurs in the rotational position information detected by the rotational position information detector,
- the rotational position information detector has a plurality of sensor elements configured to detect magnetic signals having mutually different phases as the rotational position information, and
- when the diagnosis unit diagnoses that a part of the rotation information detection function units of the two or more channels is abnormal, the motor drive control unit drives and controls the electric motor on the basis of the rotation information output from the remaining normal rotation information detection function units.

15. The motor drive control apparatus according to claim 3, wherein the rotation information detection function unit has two or more channels,
- the rotation information detection function unit has a diagnosis unit configured to diagnose whether or not an abnormality occurs in the rotational position information detected by the rotational position information detector,
- the rotational position information detector has a plurality of sensor elements configured to detect magnetic signals having mutually different phases as the rotational position information, and
- when the diagnosis unit diagnoses that a part of the rotation information detection function units of the two or more channels is abnormal, the motor drive control unit drives and controls the electric motor on the basis of the rotation information output from the remaining normal rotation information detection function units.

16. The motor drive control apparatus according to claim 4, wherein the rotation information detection function unit has two or more channels,
- the rotation information detection function unit has a diagnosis unit configured to diagnose whether or not an abnormality occurs in the rotational position information detected by the rotational position information detector,
- the rotational position information detector has a plurality of sensor elements configured to detect magnetic signals having mutually different phases as the rotational position information, and
- when the diagnosis unit diagnoses that a part of the rotation information detection function units of the two or more channels is abnormal, the motor drive control unit drives and controls the electric motor on the basis of the rotation information output from the remaining normal rotation information detection function units.

17. The motor drive control apparatus according to claim 5, wherein the rotation information detection function unit has two or more channels,
- the rotation information detection function unit has a diagnosis unit configured to diagnose whether or not an abnormality occurs in the rotational position information detected by the rotational position information detector,
- the rotational position information detector has a plurality of sensor elements configured to detect magnetic signals having mutually different phases as the rotational position information, and
- when the diagnosis unit diagnoses that a part of the rotation information detection function units of the two or more channels is abnormal, the motor drive control unit drives and controls the electric motor on the basis of the rotation information output from the remaining normal rotation information detection function units.

18. The motor drive control apparatus according to claim 6, wherein the rotation information detection function unit has two or more channels,
- the rotation information detection function unit has a diagnosis unit configured to diagnose whether or not an abnormality occurs in the rotational position information detected by the rotational position information detector, the rotational position information detector has a plurality of sensor elements configured to detect magnetic signals having mutually different phases as the rotational position information, and when the diagnosis unit diagnoses that a part of the rotation information detection function units of the two or more channels is abnormal, the motor drive control unit drives and controls the electric motor on the basis of the rotation information output from the remaining normal rotation information detection function units.

19. The motor drive control apparatus according to claim 2, wherein the rotation information detector has:
a rotation angle detector configured to detect a motor rotation angle of the electric motor on the basis of the rotational position information; and
a rotation information measurement unit that measures a change amount of the rotational position of the electric motor and a rotation count on the basis of the rotational position information.

20. The motor drive control apparatus according to claim 3, wherein the rotation information detector has:
a rotation angle detector configured to detect a motor rotation angle of the electric motor on the basis of the rotational position information; and
a rotation information measurement unit that measures a change amount of the rotational position of the electric motor and a rotation count on the basis of the rotational position information.

* * * * *